United States Patent
Ito

(10) Patent No.: US 9,112,196 B2
(45) Date of Patent: Aug. 18, 2015

(54) FUEL, FUEL CELL SYSTEM, FUEL CELL VEHICLE AND OPERATING METHOD FOR FUEL CELL SYSTEM

(75) Inventor: Masashi Ito, Yokosuka (JP)

(73) Assignee: NISSAN MOTOR CO., LTD., Yokohama-Shi (JP)

( * ) Notice: Subject to any disclaimer, the term of this patent is extended or adjusted under 35 U.S.C. 154(b) by 1618 days.

(21) Appl. No.: 12/097,432

(22) PCT Filed: Nov. 29, 2006

(86) PCT No.: PCT/JP2006/324321
§ 371 (c)(1),
(2), (4) Date: Jun. 13, 2008

(87) PCT Pub. No.: WO2007/069504
PCT Pub. Date: Jun. 21, 2007

(65) Prior Publication Data
US 2009/0233128 A1    Sep. 17, 2009

(30) Foreign Application Priority Data

Dec. 15, 2005   (JP) ................................. 2005-362185

(51) Int. Cl.
| | |
|---|---|
| C10L 1/22 | (2006.01) |
| C10L 1/222 | (2006.01) |
| C10L 1/223 | (2006.01) |
| C10L 1/234 | (2006.01) |
| H01M 8/04 | (2006.01) |
| H01M 8/10 | (2006.01) |

(52) U.S. Cl.
CPC ...... *H01M 8/04082* (2013.01); *H01M 8/04186* (2013.01); *H01M 8/1009* (2013.01); *H01M 8/1023* (2013.01); *H01M 8/1032* (2013.01); *H01M 8/1039* (2013.01); *H01M 8/1011* (2013.01); *H01M 2250/20* (2013.01); *Y02E 60/523* (2013.01); *Y02T 90/32* (2013.01)

(58) Field of Classification Search
CPC ........ C10L 10/00; C10L 1/224; C10L 1/2383
USPC ..................... 44/347, 340; 429/347
See application file for complete search history.

(56) References Cited

U.S. PATENT DOCUMENTS

| | | | |
|---|---|---|---|
| 3,556,748 A * | 1/1971 | Stedman | .......................... 44/431 |
| 4,398,505 A | 8/1983 | Cahill | |
| 5,205,945 A | 4/1993 | Cardis et al. | |
| 6,375,922 B1 * | 4/2002 | Ishii et al. | ..................... 423/591 |
| 6,518,419 B1 | 2/2003 | Van Der Lugt et al. | |
| 6,777,516 B2 | 8/2004 | Li et al. | |

(Continued)

FOREIGN PATENT DOCUMENTS

| | | |
|---|---|---|
| EP | 1 151 994 A | 11/2001 |
| EP | 1 574 559 A | 9/2005 |

(Continued)

OTHER PUBLICATIONS

Machine Translation of JP2004-227865.*

(Continued)

*Primary Examiner* — Prem C Singh
*Assistant Examiner* — Ming Cheung Po
(74) *Attorney, Agent, or Firm* — Foley & Lardner LLP

(57) ABSTRACT

A direct type fuel cell (1) is supplied with a fuel comprised of hydrocarbon and antioxidant, to have a maintained durability.

26 Claims, 13 Drawing Sheets

(56) References Cited

U.S. PATENT DOCUMENTS

| | | |
|---|---|---|
| 2003/0008196 A1 | 1/2003 | Wessel et al. |
| 2003/0078308 A1 | 4/2003 | Holdcroft et al. |
| 2007/0191634 A1* | 8/2007 | Hirai et al. ............ 562/410 |
| 2008/0044709 A1 | 2/2008 | Ito |
| 2008/0050631 A1 | 2/2008 | Ito et al. |

FOREIGN PATENT DOCUMENTS

| | | |
|---|---|---|
| JP | 59-185787 A | 10/1984 |
| JP | 2000-223135 A | 8/2000 |
| JP | 2000-251906 A | 9/2000 |
| JP | 2001-118591 A | 4/2001 |
| JP | 2002-53888 A | 2/2002 |
| JP | 2003-86188 A | 3/2003 |
| JP | 2003-109623 A | 4/2003 |
| JP | 2003-117398 A | 4/2003 |
| JP | 2003-201352 A | 7/2003 |
| JP | 2003-226743 A | 8/2003 |
| JP | 2003-336089 A | 11/2003 |
| JP | 2004-134269 A | 4/2004 |
| JP | 2004-227865 | 8/2004 |
| JP | 2004-227865 A * | 8/2004 |
| JP | 2005-190752 A | 7/2005 |
| JP | 2006-49263 A | 2/2006 |
| JP | 2006-100251 A | 4/2006 |
| JP | 2006-156295 A | 6/2006 |
| JP | 2006-249122 | 9/2006 |
| WO | WO 00/24796 | 5/2000 |
| WO | WO 2006/006501 A | 1/2006 |
| WO | WO 2006/006502 A | 1/2006 |

OTHER PUBLICATIONS

Daniel N. Prater, John H. Rusek, Energy density of a methanol/ydroen peroxide fuel cell, 2003, Applied Energy, 74, 135-140.*

Daniel N. Prater, John H. Rusek, Energy Density of a methanol/hydrogen peroxide fuel cell, 2003, Applied Energy, 74, 135-140.*

De Jonge, "Synergism of Antioxidants," *Pure and Applied Chemistry*, 1983, pp. 1637-1650, vol. 55, No. 10.

Ezerskis et al., Oxidation of Chlorophenols on Pt Electrode in Alkaline Solution Studied by Cyclic Voltammetry, Galvanostatic Electrolyis, and Gas Chromatography-Mass Spectometry, *Pure and Applied Chemistry*, 2001, pp. 1929-1940, vol. 73, No. 12.

Ota et al., "Development of Fuel Cell Vehicles & Their Materials", CMC Publishers Co., Ltd., Dec. 2002, pp. 20-21.

"Researches and Developments of Proton-Exchange Membraane Fuel Cell", Kyoto University Graduate School of Engineering as entrustee from the New Energy and Industrial Technology Development Organization, Mar. 2002, pp. 1-44.

Masashi Ito et al., USPTO Office Action, U.S. Appl. No. 11/571,865, Jan. 6, 2010, 10 pages.

Masashi Ito et al., USPTO Notice of Allowance, U.S. Appl. No. 11/571,865, May 18, 2010, 9 pages.

Masashi Ito, USPTO Office Action, U.S. Appl. No. 11/631,943, Feb. 4, 2010, 10 pages.

Ito et al., "Fuel cell system for fuel cell vehicle, has fuel cell having electrodes and antioxidant, which is provided in electrodes or contacted with electrodes", Database WPI Week 2006, Derwent Publications Ltd., An 2006-110140, XP-002421613, 3 pgs.

Ito et al., "Fuel cell system vehicle solid'polymer electrolytic film antioxidant contact", Database WPI, Derwent Publications Ltd., An 2006-110141, XP-002421614, 3 pgs.

Kyoto University Graduate School of Engineering As Entrustee From the New Energy and Industrial Technology Development Organization, "Researches and Developments of Proton-Exchange Membrane Fuel Cell", 2001 Yearly Result Report, 50 pgs.

Watanabe, "For Development of a High-Temperature Operable Direct Methanol Fuel Cell", Representative of a fiscal 1999 adopted study 'Resources Recycling, Energy Minimum Type System Technology', 20 pgs.

Hitachi Ltd As Entrustee From the New Energy and Industrial Technology Development Organization, "Researches and developments of a durability-elevated hydrocarbon system electrolyte membrane for Proton-Exchange membrane fuel cells in the Proton-Exchange Membrane Fuel Cell Elements Technology Development and Like Program in the Proton-Exchange Membrane Fuel Cell System Technology Project", Report in Mar. 2003, 10 pgs.

Notification of Reasons for Refusal in JP Appln No:2005-362185 dated Oct. 4, 2011.

European Office Action dated May 6, 2015 issued in Application No. 06834076.9.

* cited by examiner

3-CARBAMOYL-2,2,5,5-TETRAMETHYLPYRROLINE-1-YLOXY

FIG. 9
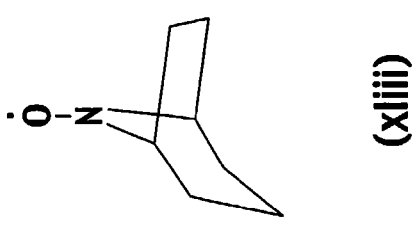
(xli)
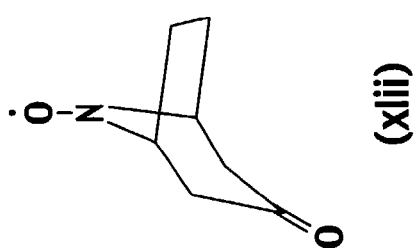
(xlii)
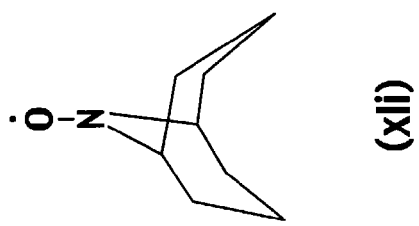
(xliii)
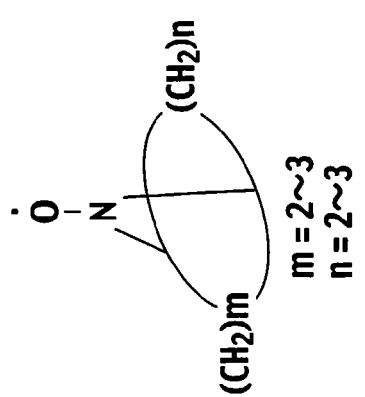
m = 2~3
n = 2~3
(xl)
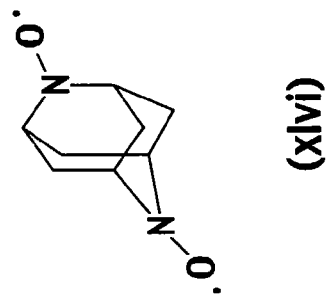
(xliv)
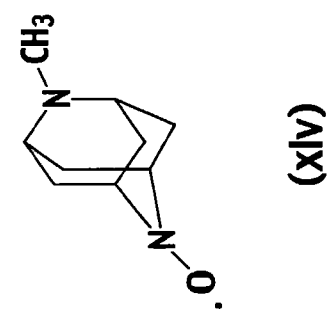
(xlv)
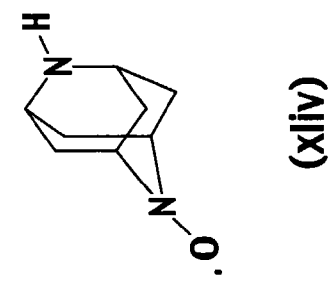
(xlvi)

FUEL, FUEL CELL SYSTEM, FUEL CELL VEHICLE AND OPERATING METHOD FOR FUEL CELL SYSTEM

TECHNICAL FIELD

The present invention relates to a fuel, a fuel cell system, a fuel cell vehicle, and an operating method for a fuel cell system.

BACKGROUND ART

The fuel cell technology is attracting attention as a solution to the problem of energy resources, as well as to the issue of global warming due to $CO_2$ emission.

The fuel cell is adapted for electrochemical oxidation of a fuel, such as hydrogen or methanol or any hydrocarbon else in the cell, to effect a direct conversion of chemical energy of the fuel to electrical energy to be taken out.

The fuel cell is thus free from emissions of combustion products of fuel, such as $NO_X$ and $SO_X$, and attracts attention as a clean energy source for internal combustion engines such as for automobiles, or for thermal power plants.

There are some types of fuel cells, with a proton-exchange membrane fuel cell (referred herein sometimes to "PEFC") inclusive, which is now most watched, and developed.

The PEFC has various advantages, such that it is (1) adapted for an operation to be facile in start and stop at low temperatures, (2) allowed to be high in theoretical voltage as well as in theoretical efficiency of conversion, (3) implemented with a liquid-free electrolyte allowing a flexible design of cell structure, such as a vertical type, and (4) configured for an interface between ion exchange membrane and electrode to have a secured three-phase interface as a reaction field to take out an enhanced amount of current, achieving a high density power output.

Among others of the PEFC, the direct type fuel cell, to which a liquid methanol or any hydrocarbon fuel else is directly supplied for power generation, can be predominantly reduced in size in comparison with the hydrogen type that employs a high-pressure hydrogen storage container to be large in scale, and is different from the gas reforming type in that the former does not need any apparatus associated with a fuel reformer, allowing for a simplified configuration of entire system, as well as for facilitated startup and maintenance services, thus having best applications to a compact mobile power supply for drives or power supply for portable devices.

The PEFC thus most-watched yet has many unsolved problems. In particular, techniques of polyelectrolyte membrane constitute a top challenge.

An electrolyte membrane that has a now widest application is made of a perfluorosulfonic acid polymer, which is typified by the Nafion® film commercially available from Du Pont Co., U.S.A., and has a history, where it has been developed as a membrane having a tolerance to active oxygen that the fuel cell generates at the air electrode (anode as positive-pole). Long endurance tests have not yet revealed a sufficient tolerance.

The principle of operation of a fuel cell includes two electrochemical processes, being an $H_2$ oxidation at the fuel electrode (cathode as negative-pole), and a four-electron reduction of molecular oxygen ($O_2$) shown by formula (A1) below, which produces water.

$$O_2 + 4H^+ + 4e^- \rightarrow 2H_2O \tag{A1}$$

Actually, concurrent side reactions occur. Typically, a two-electron reduction of $O_2$ takes place at the air electrode, producing hydrogen peroxide ($H_2O_2$), as shown by formula (A2) below.

$$O_2 + 2H^+ + 2e^- \rightarrow H_2O_2 \tag{A2}$$

Hydrogen peroxide is stable, and has a long life, though weak in oxidizability.

Hydrogen peroxide decomposes, following reaction formulas (A3) and (A4) shown below. When decomposing, it generates radicals, such as hydroxy radical (.OH) and hydroperoxy radical (.OOH). Such radicals, in particular hydroxy radical, are strong in oxidizability, so that even perfluorosulfonated polymer used as an electrolyte membrane may be decomposed in a long use.

$$H_2O_2 \rightarrow 2.OH \tag{A3}$$

$$H_2O_2 \rightarrow .H + .OOH \tag{A4}$$

Low-valence ions of transition metal such as $Fe^{2+}$, $Ti^{3+}$, or $Cu^+$, if present in the fuel cell, cause a Haber-Weiss reaction, where hydrogen peroxide is one-electron reduced by such a metal ion, generating hydroxy radical.

Hydroxy radical, most reactive among free radicals, has a very strong oxidizability, as is known. If the metal ion is an iron ion, the Haber-Weiss reaction is known as a Fenton reaction shown by formula (A5) below.

$$Fe^{2+} + H_2O_2 \rightarrow Fe^{3+} + OH^- + .OH \tag{A5}$$

Such being the case, metal ions, if mixed in an electrolyte membrane, cause a Haber-Weiss reaction, whereby hydrogen peroxide in the electrolyte membrane is changed into hydroxy radical, whereby the electrolyte membrane may be deteriorated (Kyoto University Graduate School of Engineering as entrustee from the New Energy and Industrial Technology Development Organization, "2001 yearly results report, researches and developments of proton-exchange membrane fuel cell, researches on deterioration factors of proton-exchange membrane fuel cell, find research (1) on deterioration factors, deterioration factor of electrode catalyst/electrolyte interfaces", March 2002, p. 13, 24, 27).

With that, to prevent an electrolyte membrane from being oxidized by hydroxy radical, there has been a method proposed in Japanese Patent Application Laying-Open Publication No. 2000-223135, for example, in which a compound with phenolic hydroxyl is mixed in the electrolyte membrane, so that peroxide radicals are trapped to be inactive.

Another method is proposed in Japanese Patent Application Laying-Open Publication No. 2004-134269, in which an electrolyte membrane has a phenol compound, amine compound, sulfur compound, phosphorus compound, or the like mixed therein as anantioxidant to vanish generated radicals.

Another method proposed in Japanese Patent Application Laying-Open Publication No. 2003-109623 has an electrolyte membrane disposed adjacent to a catalyst layer containing molecules having a smaller bond energy than carbon-fluorine bonding, the molecules reacting with priority to hydroxy radicals, thereby protecting the electrolyte membrane.

DISCLOSURE OF INVENTION

Generation of hydroxy radical occurs with a highest tendency in a vicinity of a three-phased interface of an air electrode, that is an environment where oxygen and platinum as an electrode catalyst exist, and compounds tend to be oxidized, so that those methods in which an electrolyte membrane simply contains an oxidation-preventive compound, as described above, may have this compound also oxidized to disappear, whether hydroxy radical is present or not, thus resulting in an inefficient prevention of oxidation.

Still less, that compound may react with hydroxy radical to generate an unstable radical or peroxide, which may act as an initiator of additional reaction for oxidation, causing a deterioration.

This present invention is made in view of such points.

It therefore is an object of the invention to provide a fuel, a fuel cell system, a fuel cell vehicle, and an operating method for a fuel cell system, adapted for an efficient prevention of oxidation to achieve a maintained durability.

According to the invention, a fuel to be supplied to a direct type fuel cell comprises a hydrocarbon and an antioxidant.

According to the invention, a fuel cell system comprises a direct type fuel cell, and a fuel supply configured to supply the fuel cell with a fuel according to the invention.

According to the invention, a fuel cell vehicle comprises a fuel cell system according to the invention.

According to the invention, a operating method for a fuel cell system including a direct type fuel cell comprises supplying the fuel cell with a fuel according to the invention.

BRIEF DESCRIPTION OF DRAWINGS

The above and further objects and novel features of the present invention will more fully appear from the following detailed description when the same is read in conjunction with the accompanying drawings, in which:

FIG. 9 is a list of chemical formulas of other exemplary antioxidants applicable to a fuel for the fuel cell stack of fuel cell system of FIG. 1;

BEST MODE FOR CARRYING OUT THE INVENTION

Figure 1:
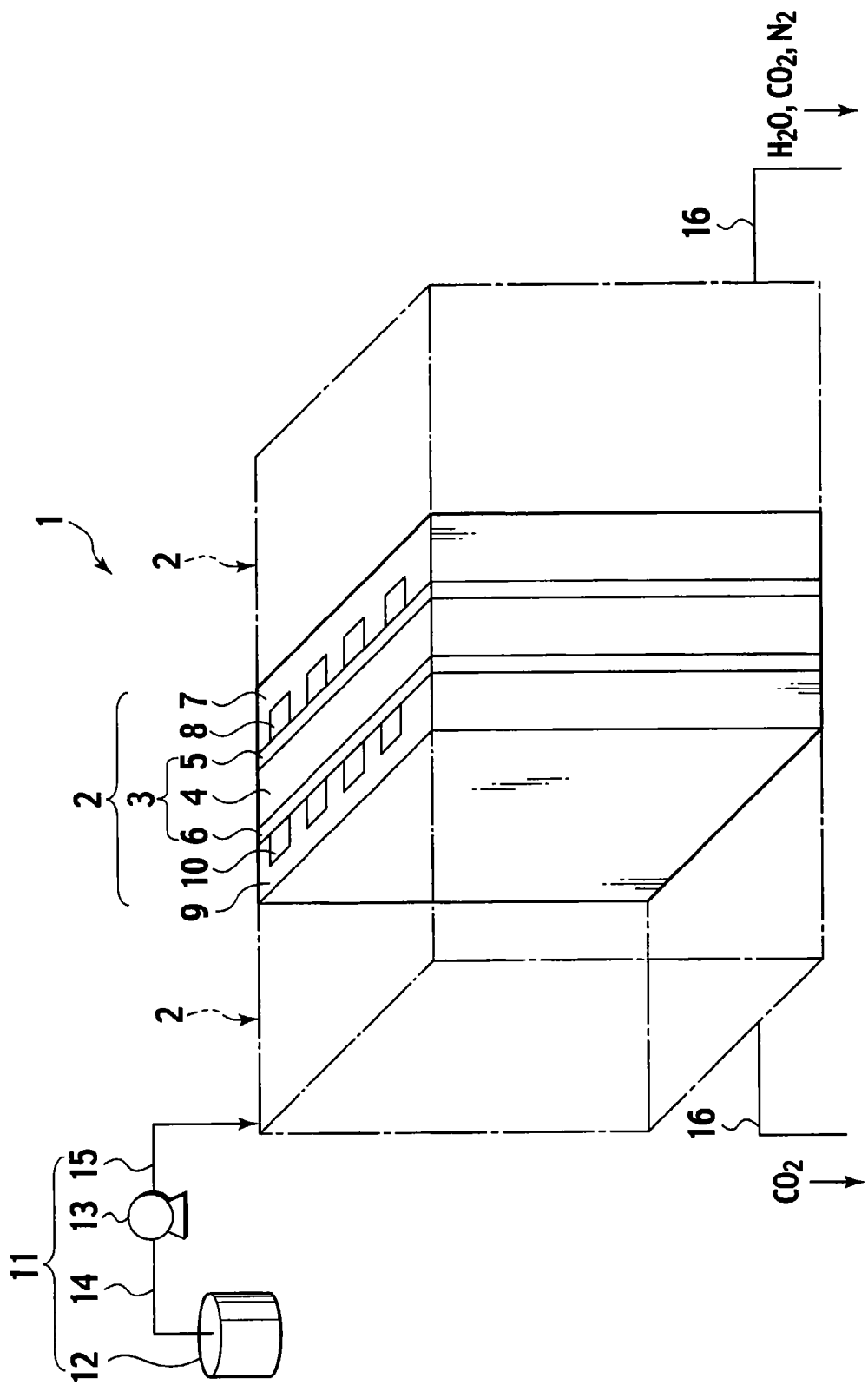
FIG. 1 is a pictorial fluid circuit diagram of a fuel cell system including a fuel cell stack as a direct type fuel cell according to an embodiment of the invention.

There will be described into details a fuel, a fuel cell system, a fuel cell vehicle, and an operating method for a fuel cell system according to a preferred embodiment of the present invention, as a best mode for carrying out the invention, with reference made to the accompanying drawings. In the drawings, like members or elements are designated by like reference characters.

Description is first made of a fuel cell system according to an embodiment of the invention, with reference to FIG. 1 to FIG. 4.

Figure 2:
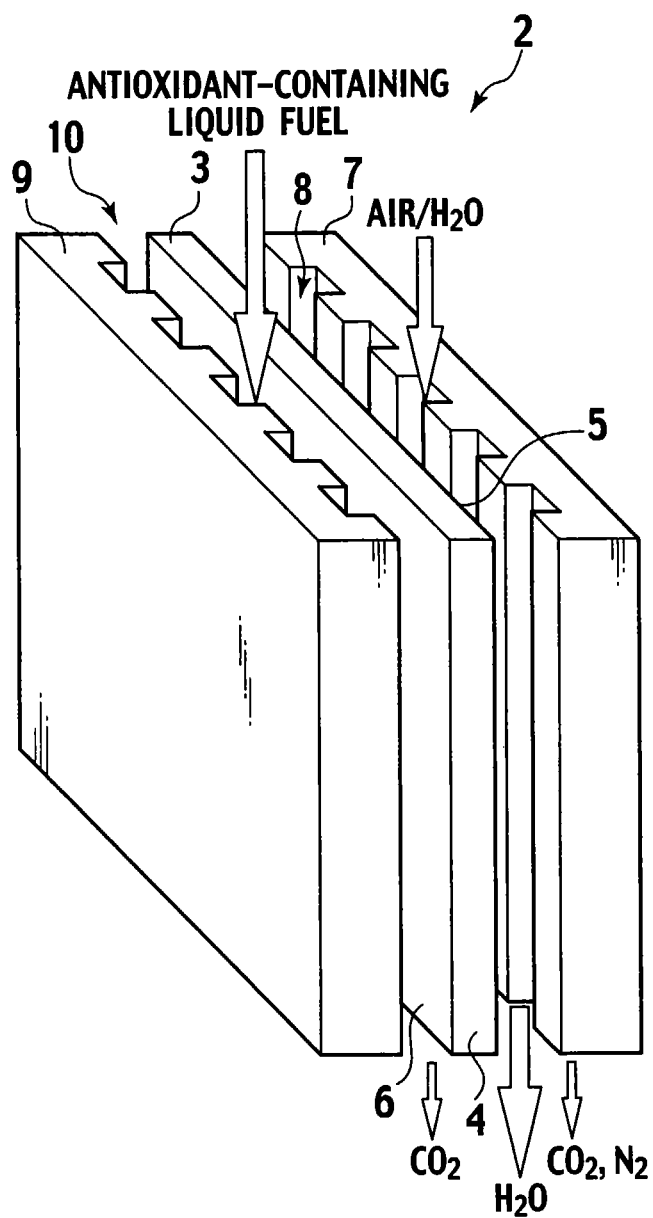
FIG. 2 is an exploded view of an essential portion including a unit cell of the fuel cell stack of FIG. 1.
Figure 3:
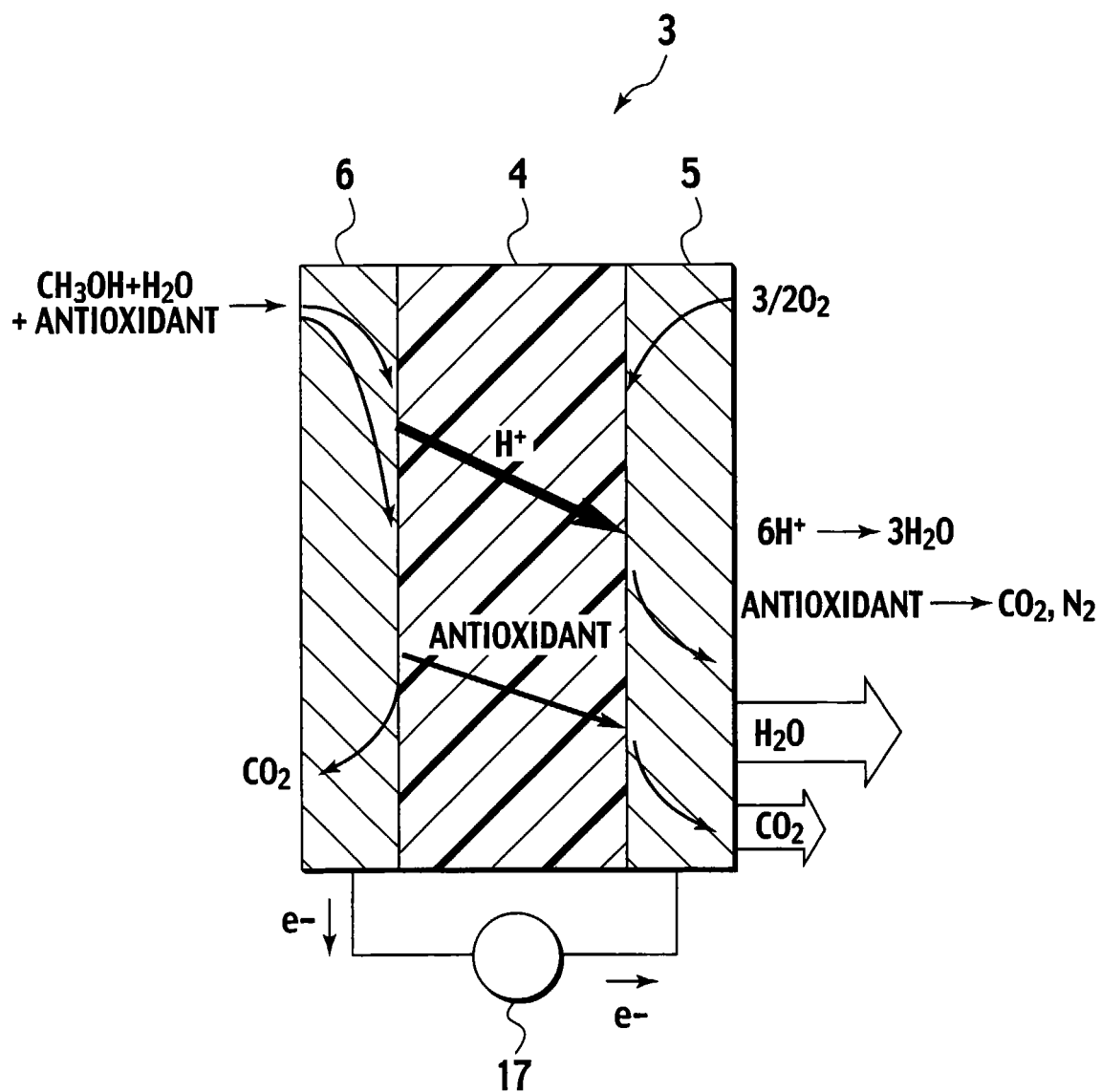
FIG. 3 is a sectional view of a membrane-electrode assembly (referred herein sometimes to "MEA") of the unit cell of FIG. 2.
Figure 4:
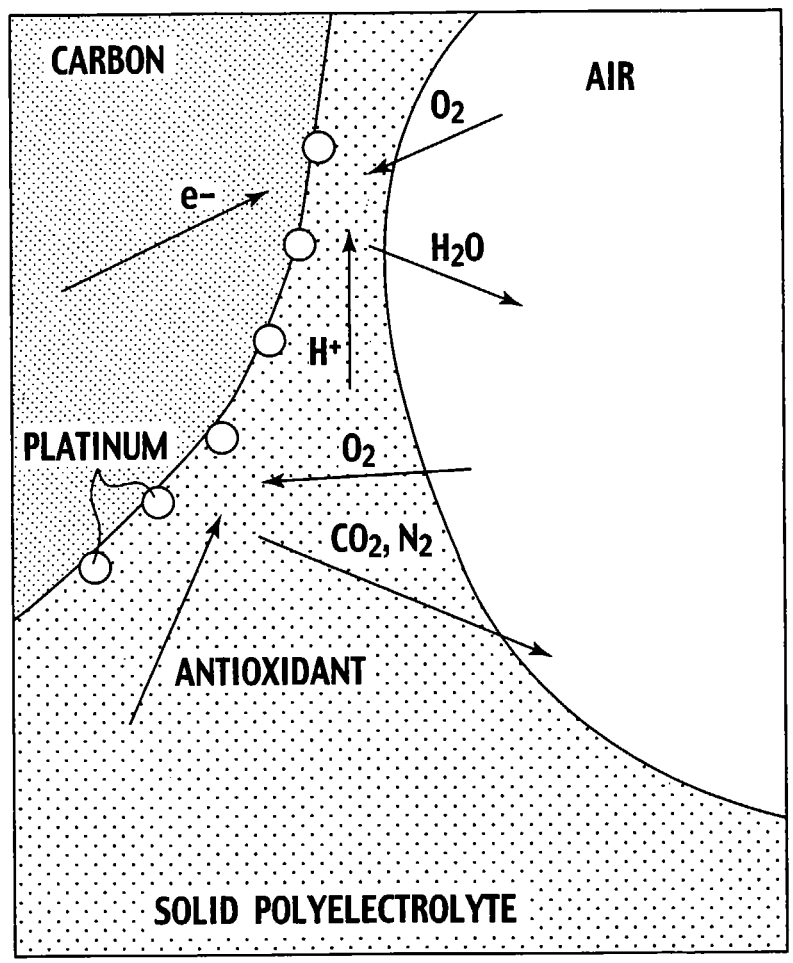
FIG. 4 is a phase diagram of an essential portion of an air electrode of the MEA of FIG. 3.

FIG. 1 shows, as a pictorial fluid circuit diagram, a fuel cell system including a fuel cell stack 1 as a direct type fuel cell according to an embodiment of the invention; FIG. 2, in an exploded view, an essential portion including a unit cell 2 of the fuel cell stack 1; FIG. 3, in a sectional view, an MEA (membrane-electrode assembly) 3 of the unit cell 2; and FIG. 4, as a phase diagram, an essential portion of an air electrode 5 of the MEA 3.

The fuel cell system according to the embodiment is configured with: the fuel cell stack 1, as its portion of a fuel cell of a direct in which the fuel supply is directly performed from a fuel source (with no routes passing a reformer or the like); a utility supply system for supplying the fuel cell stack 1 with necessary utilities, such as coolant (e.g. cooling water), an oxidizer (e.g. air), and a fuel according to the invention; and a utility collecting discharge system for collecting unused utilities, reaction products, and the like from the fuel cell stack 1, discharging parts of them as circumstances permit. In this fuel cell system, the portion of fuel cell of the direct type may well be a simplex fuel cell substituting for the fuel cell stack 1 which is a complex fuel cell.

The utility supply system includes a fuel supply line 11, which is installed outside the fuel cell stack 1, and implemented as a measures for direct supply of the fuel to the fuel cell stack 1. The fuel supply line 11 includes a fuel tank 12 having sealed therein solution of antioxidant and hydrocarbon as the fuel, a liquid transfer pump 13 for transfer of the fuel, a connection line 14 between tank 12 and pump 13, and a connection line 15 between pump 13 and stack 1.

The utility collecting discharge system includes discharge lines 16 for discharge of $H_2O$, $CO_2$, $N_2$, etc.

As illustrated in FIG. 1, the fuel cell stack 1 is configured as a lamination of unit cells 2 each respectively serving as a fundamental unit for power generation by electrochemical reactions, while the lamination of unit cells 2 has end flages (not shown) fit on its both ends and connected at their peripheral parts by tie bolts (not shown).

As illustrated in FIG. 2, each unit cell 2 is configured with: the MEA 3 as a combination of a solid polymer electrolyte membrane 4, the air electrode 5 which is provided on one side of the electrolyte membrane 4, and a fuel electrode 6 that is provided on the opposite side of the electrolyte membrane 4; a unit cell separator 7 that is disposed on the air electrode 5 side of MEA 3, for cooperation with the MEA 3 to have air channels defined in between; and another unit cell separator 9 that is disposed on the fuel electrode 6 side of MEA 3, for cooperation with the MEA 3 to have liquid fuel channels defined in between.

In each unit cell 2, the solid polymer electrolyte membrane 4 is made by a film of perfluorocarbon polymer having sulfonate group (trade name: Nafion® by Du Pont Co., U.S.A.), but is not limited thereto. The air electrode 5 and the fuel electrode 6 are each respectively made by a catalyst layer in which particles of catalyst made of platinum, or particles platinum-base alloy, are held by carbon.

The separator 7 on the air electrode side of MEA 3, as well as the separator 9 on the fuel electrode side, is configured as a carbon or metal member of a plate shape that has: air channels 8 formed in one side; liquid fuel channels 10, in the opposite side; and coolant (e.g. cooling water) channels (not shown), in between. In other words, each air channel 8 is defined by and between the air electrode 5 and the air electrode side separator 7, for supplying the air electrode 5 with air as a reactant gas. Each liquid fuel channel 10 is defined by and between the fuel electrode 6 and the fuel electrode side separator 9, for supplying the fuel electrode 6 with a liquid fuel according to the invention. The fuel channel 10 is connected via an adequate manifold to the connection line 15 of the fuel supply line 11.

Each separator 7, 9 may have formed therein through holes, grooves, or the like for intercommunication between the above-noted channels and supply and collection manifolds of respective utilities (fuel, air, coolant). Between each separator 7, 9 and each of associated electrodes 5, 6 there may be a diffusion layer made of carbon paper, unwoven carbon cloth, etc.

In each unit cell 2 of the fuel cell stack 1 configured as a direct type fuel cell, air and liquid fuel are supplied to the air channels 8 and the fuel channels 10, and therefrom to the air electrode 5 and the fuel electrode 6, respectively, where they react as shown below by formulas (B1) and (B2) for the case of methanol used as a hydrocarbon fuel.

At the fuel electrode: $CH_3OH+H_2O \rightarrow CO_2+6H^++6e^-$ (B1)

At the air electrode: $(3/2)O_2+6H^++6e^- \rightarrow 3H_2O$ (B2)

Figure 5:
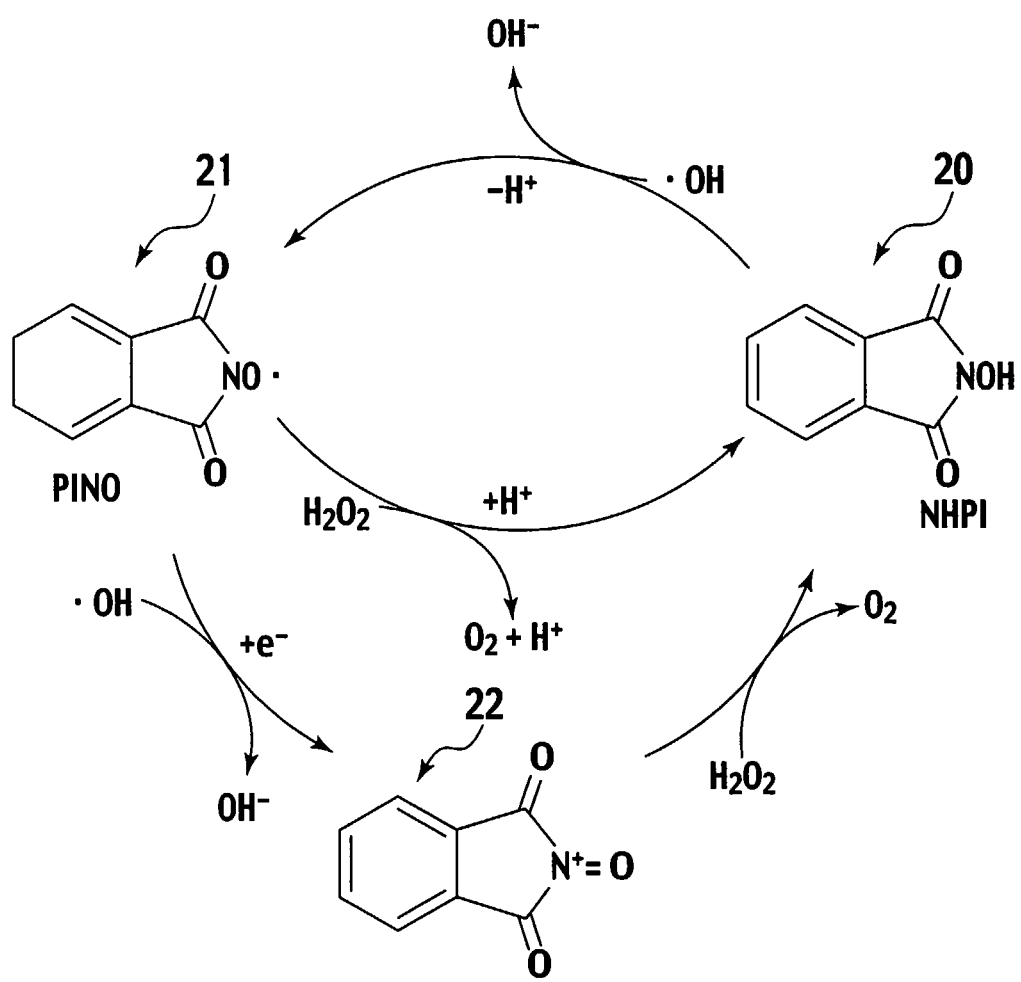
FIG. 5 is a cyclic flow diagram showing the mechanism of disappearance of active oxygen by NHPI.

As illustrated in FIG. 3, with methanol and water fed to the fuel electrode 6, a reaction of formula (B1) proceeds, generating $H^+$ (proton) and $e^-$ (electron). $H^+$ is hydrated to move through the solid polymer electrolyte membrane 4 to the air electrode 5, where it ($H^+$) reacts to $e^-$ and oxygen gas of air fed thereto, so that a reaction of formula (B2) proceeds, producing water. With an electromotive force then developed, electrons generated at the fuel electrode 6 are conducted to the air electrode 5, via an external circuit 13, as illustrated in FIG. 5.

At the air electrode 5, the reaction of formula (B2) appears as a generation of water by four-electron reduction of molecular oxygen ($O_2$). This four-electron reduction of oxygen accompanies concurrent side reactions that generate free radicals, such as superoxide anion ($O_2^-$) as a one-electron reduction body of oxygen, hydroperoxy radical (.OOH) as a conjugate acid of superoxide, hydrogen peroxide ($H_2O_2$) as a two-electron reduction body, and hydroxy radical (.OH) as a three-electron reduction body.

Generation mechanisms of those free radicals are considered to be complex reactions by way of such elementary reaction processes as shown by formulas (B3) to (B7) below.

$O_2+e^- \rightarrow O_2^-$ (B3)

$O_2^-+H^+ \rightarrow .OOH$ (B4)

$O_2+2H^++2e^- \rightarrow H_2O_2$ (B5)

$H_2O_2+H^++e^- \rightarrow H_2O+.OH$ (B6)

$H_2O_2 \rightarrow 2.OH$ (B7)

Generated active oxygen (species) are considered to be reduced finally to water, by way of such elementary reaction process as shown by formulas (B8) to (B10) below, where $E°$ is a standard redox potential given in terms of NHE (normal hydrogen electrode).

$.OOH+H^++e^- \rightarrow H_2O_2$, $E°=1.50$ V (B8)

$H_2O_2+2H^++2e^- \rightarrow 2H_2O$, $E°=1.77$ V (B9)

$.OH+H^++e^- \rightarrow H_2O$, $E°=2.85$ V (B10)

Now controversial is hydroxy radical that has a redox potential as high as 2.85V, and is strong in oxidizability. Hydroxy radical is most reactive among free radicals, and has a very short life of one millionth second. As the oxidizability is strong, hydroxy radical reacts with another molecule, unless it is promptly reduced.

Most controversial cases of oxidative degradation may have been caused by hydroxy radical. Generation of hydroxy radical is maintained by way of formulas (B3) to (B7) during power generation of fuel cell. Hydroperoxy radical and hydrogen peroxide, though weaker in oxidizability than hydroxy radical, return on water by ways processes that may generate hydroxy radical. Like this, the generation of hydroxy radical continues semipermanently, so long as power is generated in a direct type fuel cell. The solid polymer electrolyte membrane may thus be deteriorated, unless the direct type fuel cell is continuously supplied with a reducing agent that can decompose hydroxy radical, or a compound that can decompose active oxygen which may be reduced, with a resultant generation of hydroxy radical.

The fuel cell system according to this embodiment has the fuel supply line 11 as an external fuel supply measures for supplying each unit cell 2 of the fuel cell stack 1, which is configured as a direct type fuel cell, with an "antioxidative liquid fuel comprised of hydrocarbon and antioxidant". Therefore, even when power is generated at the fuel cell stack 1, continuously generating active oxygen, the fuel cell stack 1 is adapted for a successful decomposition and resultant elimination of active oxygen therein, by antioxidant contained in the fuel supplied thereto, and is allowed for a suppressed deterioration of solid polymer electrolyte membrane.

Further, an efficient decomposition of active oxygen can be maintained by a normal supplement of antioxidant from outside of fuel cell stack 1, even in an environment where the antioxidant tends to be oxidized, thus allowing for provision of a fuel cell system with excellent durability.

In this embodiment, the antioxidative liquid fuel (containing antioxidant) is supplied from the fuel supply line 11 to the fuel cell stack 1, where it is distributed to the fuel electrode 9 side of MEA 3 of each unit cell 2, via associated distribution channels and fuel channels 10.

The air electrode side separator 7 and the fuel electrode side separator 9 have air channels 8 and liquid fuel channels 10 defined by their surfaces for supply of air as a reactant gas and liquid fuel, as described. The reactant gas and the liquid fuel pass the air channels 8 and the liquid fuel channels 10, as indicated by corresponding arrows in FIG. 2.

The liquid fuel containing oxidant is supplied through the liquid fuel channels 10 to the fuel electrode 6, where the hydrocarbon fuel is oxidized, and the antioxidant to be involved in no fuel cell reactions is uniformly diffused to the air electrode 5 in dependence on a concentration gradient, as indicated by a corresponding arrow in FIG. 3.

The air channels 8 of the air electrode side separator 7 serve as channels for removal of water as a reaction product, as well.

Overfed and unused antioxidant, as well as antioxidant having been changed to an oxidant by decomposition of active oxygen, is oxidized by catalyst on a three-phase intersurface, and changed to $CO_2$, $H_2O$, $N_2$, etc. which are conducted and collected, together with produced water, through channels 8 to a discharge line 16 (FIG. 1), to be discharged as circumstances permit, as indicated by corresponding arrows in FIG. 2 and FIG. 3. The antioxidant, as it has been changed by reaction with active oxygen into an oxidant, unstable radical, or peroxide, is thus kept from acting as an initiator of additional oxidation, causing a deterioration of electrolyte membrane 4.

The antioxidant should be soluble in hydrocarbon, even if the solubility to hydrocarbon is low, for uniform dispersion in the air electrode 5. If insoluble, it will not be supplied enough to achieve a sufficient effect for decomposition of active oxygen. The antioxidant should thus be contained in the fuel by a greater concentration than necessary. The antioxidant may preferably have a concentration within a range of $10^{-4}$ to 1% to the fuel, or more preferably, within a range of $10^{-3}$ to 1% to the fuel. An organic solvent different from the hydrocarbon fuel may be added, as necessary, within an extent where it will not obstruct reactions of fuel cell.

The antioxidant may preferably be a hydrocarbon system compound composed of four elements, being carbon, oxygen, nitrogen, and hydrogen. Other elements else than carbon, oxygen, nitrogen, and hydrogen may poison platinum in electrode, adversely affecting a power generation performance of the fuel cell. Base metal elements may promote generation of hydroxy radical.

To cover an application including oxidation in and discharge from air electrode, the antioxidant may preferably be composed simply of the four elements being carbon, oxygen, nitrogen, and hydrogen, as a hydrocarbon system compound to be decomposed into $CO_2$, $H_2O$, $N_2$, and the like.

Hydroxy radical has a very high redox potential so that, thermodynamically, most hydrocarbon compounds composed of the above-noted four elements may act as a reductant on hydroxy radical. Kinetically, those compounds may be different in reducing ability. In view of high reactivity of hydroxy radical, it is desirable for the antioxidant to be kinetically faster in reducing reaction.

It also is important to consider the stability of the oxidant the antioxidant is to be oxidized to, that is, the compound to be obtained when it is oxidized by active oxygen. If the oxidant of antioxidant is unstable, the oxidize substance may act as an initiator of new side reaction, promoting the deterioration of electrolyte membrane.

As compounds kinetically relatively fast in reducing reaction and chemically stable in the state of oxidant, there may be taken: secondary alcohol system compounds having hydroxyl group, such as isopropanol, 2-butanol, and cyclohexanol; aromatic series having hydroxyl group, such as phenols, cresol, picric acid, naphthol, and hydroquinone; an ether system compounds, such as dioxane, tetrahydrofuran, and benzyl methyl ether, and nitrogen-containing system compounds, such as propylamine, diethylamine, acetamide, aniline, and N-hydroxy system compound.

In selection of such compounds, the stability, durability, and heat resistance of compound are important. In particular, the stability and durability of compound are most important for the decomposition of active oxygen to be maintained to use a fuel cell over a long term.

Preferably, hydrolysate of oxidant of antioxidant should also be chemically stable. For decomposition of active oxygen, it should be effective if the antioxidant supplied to the fuel electrode be kept stable till its discharge from the air electrode. Antioxidant used for decomposition of active oxygen is discharged together with produced water, and for a long-term operation of the system, the hydrolysate of antioxidant may preferably be stable without generating radicals.

For the operating temperature of fuel cell to be within a range of 80 to 90° C. in normal run, and for the heat resistance of electrolyte membrane to be enhanced in future, the antioxidant may preferably be stable in heat resistance up to a temperature about 120° C.

The antioxidant may preferably have a standard redox potential to NHE (normal hydrogen electrode) within a range of 0.68V or more and 2.85V or less. 0.68V is a standard redox potential of hydrogen peroxide, so that any compound that has a greater standard redox potential than 0.68V and has oxidizing power can act as an oxidizing agent on hydrogen peroxide. By the oxidation, hydrogen peroxide becomes oxygen, while the compound whose standard redox potential is greater than 0.68V is reduced by hydrogen peroxide. 2.85V is a standard redox potential of hydroxyl radical. For any compound that has a high standard redox potential of 2.85V or more, it therefore is difficult to act as a reducing agent on hydroxyl radical, thus constituting a undesirable difficulty in reduction of hydroxyl radical to be efficient.

In the fuel cell system described, for a reductant, as it is resulted from a reduction by hydrogen peroxide, to be the antioxidant according to this embodiment, this antioxidant may preferably be comprised of an organic mediator having a redox cycle (as electron transfer catalysis function=mediator function), where it reduces, thereby decomposing, hydroxy radical and changes to an oxidant, and thereafter returns to the original form by reaction with hydrogen peroxide.

Such being the case, if the antioxidant has a reversible redox-ability, it is possible to repeat using the antioxidant many times. This allows decomposition of active oxygen, including hydroxy radical, to be continued over a long term, besides the advantage that the effect can be achieved with a small additive amount, thus in an efficient manner.

For the oxidizability of antioxidant to be decreased, the antioxidant may preferably have a redox potential of 1.00V or less. A fluorine system film may be used as an electrolyte membrane. In this case, the potential where the fluorine system electrolyte membrane is to be oxidized ranges 2.5V or more, and if the redox potential of antioxidant is 1.00V, the electrolyte membrane is kept from being oxidized, there being no problem.

A hydrocarbon system film may be used as an electrolyte membrane. In this case, the hydrocarbon system electrolyte membrane may be oxidized when the redox potential of antioxidant contained in the fuel exceeds 1.00V. Substituting typical organic compounds, therefor, benzene is to be oxidized at 2.00V, toluene is at 1.93V, and xylene is at 1.58V. Hydrocarbon system electrolyte membrane is thus oxidized at a lower redox potential than fluorine system electrolyte membrane.

Therefore, by setting the redox potential of antioxidant within a range of 1.00V or less, the electrolyte membrane can be kept from being oxidized, allowing for a long service, even in use of a hydrocarbon system film. It is noted that the actual redox potential (RHE: real hydrogen electrode) changes depending associated conditions, such as pH and temperature, and a selection may preferably be made within a matching range.

The antioxidant may preferably comprise a compound represented by a general formula (I) below

(I)

where R1 and R2 respectively denote elements of a set of arbitrary substituent groups mutually identical or different, and X denotes an oxygen atom or hydroxyl group. More preferably, R1 and R2 are combined with each other, to form a double bond, an aromatic ring, or a nonaromatic ring.

Further, the compound may preferably comprise an imide compound represented by a general formula (II) below

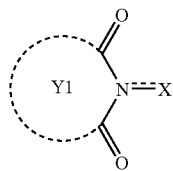
(II)

where a ring Y1 comprises any ring of a set of 5-membered to 12-membered rings double-bonded and aromatic or nonaromatic.

The above-noted compound is supplied as antioxidant to the fuel cell stack 1, where it efficiently reduces hydroxyl radical to water, thereby suppressing a deterioration of electrolyte membrane, through an elementary process shown by formula (B11) below.

$$>NOH + \cdot OH \rightarrow >NO\cdot + H_2O \tag{B11}$$

The supply of hydrogen causes generation of N-oxyl radical (>NO·), which pulls out radical hydrogen from hydrogen peroxide, to return to an original form of hydroxyamine (>NOH), as shown by formula (B12) below.

$$2(>NO\cdot) + H_2O_2 \rightarrow 2(>NOH) + O_2 \tag{B12}$$

As a typical example of the compound having a hydroxy imide group, N-hydroxyphthalimide (NHPI) may be taken. FIG. 5 shows a redox cycle of this compound, in which a reductant NHPI 20 is changed in a radical form thereof, i.e., phthalimide N-oxyl (PINO) 21 as a one-electron oxidant of NHPI 20, which is oxidized to return to the original NHPI 20, directly or indirectly via PINO$^+$ 22 as a two-electron oxidant of NHPI 20. This cycle involves a mechanism for decomposing hydrogen peroxide and hydroxyl radical as active oxygen. As is apparent from FIG. 5, NHPI 20 acts as a reducing agent on hydroxyl radical, to change to PINO 21, or reacts with or two molecules of hydroxyl radical, to generate PINO 21, PINO$^+$ 22 and water or hydroxyl ion, while PINO 21 and PINO$^+$ 22 respectively react with hydrogen peroxide, to change to the original form of NHPI 20. Along this change, PINO 21 and PINO+ 22 each respectively act as an oxidant on hydrogen peroxide, which is thereby decomposed to oxygen. Like this, the redox cycle turns through NHPI 20, PINO 21, and PINO$^+$ 22, enabling the antioxidant to be reused many times, allowing a decomposition of active oxygen to be continued over a long term, thus allowing for provision of a fuel cell system with maintained durability. In addition, as the redox cycle turns, the antioxidant having reduced hydroxyl radical will not constitute an initiator of additional side reactions.

Further, the compound represented by the general formula (II) may preferably comprise an imide compound represented by a general formula (III) below

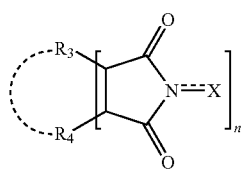
(III)

where R3 and R4 respectively denote elements of a set of hydrogen atoms, halogen atoms, alkyl groups, aryl groups, cycloalkyl groups, hydroxyl groups, alkoxyl groups, carboxyl groups, alkoxycarbonyl groups, or acyl groups, mutually identical or different, X denotes an oxygen atom or hydroxyl group, and n denotes an integer within 1 to 3.

In the compound represented by the general formula (II), substituents R3 and R4 may preferably include iodine, bromine, chlorine, and fluorine as halogen atoms. The alkyl groups may preferably include a linear chain or branch chain alkyl group of a carbon number within a range of 1 to 10 or near, such as a methyl, an ethyl, a propyl, an isopropyl, a butyl, an isobutyl, a sec-butyl, a t-butyl, a pentyl, a hexyl, a heptyl, an octyl, and a decyl group. The alkyl groups may preferably have carbon numbers within a range of 1 to 6 or near, or more preferably, be lower with a carbon number within a range of 1 to 4 or near.

The aryl groups may preferably include a phenyl group, a naphthyl group, etc. The cycloalkyl groups may preferably include a cyclopentyl, a cyclohexyl, and a cyclooctyl group, and the like.

The alkoxy groups may preferably have carbon numbers within a range of 1 to 10 or near, or more preferably, within a range of 1 to 6 or near, or be lower with a carbon number within a range of 1 to 4 or near. For example, they may be a methoxy, an ethoxy, a propoxy, an isopropoxy, a butoxy, an isobutoxy, a t-butoxy, a pentyloxy, and a hexyloxy group, and the like.

The alkoxycarbonyl groups may preferably include those alkoxycarbonyl groups whose alkoxy parts have carbon numbers within a range of 1 to 10 or near. For example, they may be a methoxycarbonyl, an ethoxycarbonyl, a propoxy carbonyl, an isopropoxy carbonyl, a butoxycarbonyl, an isobutoxycarbonyl, a t-butoxycarbonyl, a pentyloxy carbonyl, and a hexyloxy carbonyl group. The carbon number of alkoxy part may preferably range within 1 to 6 or near, or be as lower as within a range of 1 to 4 or near.

The acyl groups may preferably include those acyl groups having carbon numbers within a range of 1 to 6 or near, for example, a formyl, an acetyl, a propionyl, a butyryl, an isobutyryl, a valeryl, an isovaleryl, and a pivaloyl group.

The substituents R3 and R4 may be mutually identical or different. In the compound represented by the general formula (III), the substituents R3 and R4 may preferably be combined with each other to form a double bond, an aromatic ring, or a nonaromatic ring. R3 and R4 may be combined with each other to form any ring of 5-membered to 12-membered rings aromatic or nonaromatic, so that the aromatic ring or the nonaromatic ring may preferably be any one of 5-membered to 12-membered rings, or more preferably, any one of 6-membered to 10-membered rings, and they may be heterocycles or fused heterocycles, or more preferably, hydrocarbon rings.

The substituents R3 and R4 may be combined with each other to form any ring selective from a set of a cycloalkane, a cycloalkene, a bridged hydrocarbon ring, and an aromatic ring, and substitutions thereof. As such rings, there may be taken, for example: nonaromatic hydrocarbon rings, such as cycloalkane rings, e.g, cyclohexane ring, and cycloalkene rings, e.g. cyclohexene ring; nonaromatic bridging rings, such as bridging type hydrocarbon rings, e.g. five-norbornene ring; and aromatic rings, such as benzene rings and naphthalene rings. Those rings may have substituent groups.

In view of the stability, durability, and solubility to electrolyte membrane of compound, the antioxidant (in particular, the compound represented by the general formula (III)) may preferably comprise an imide compound represented by one of general formulas (IVa) to (IVf) below

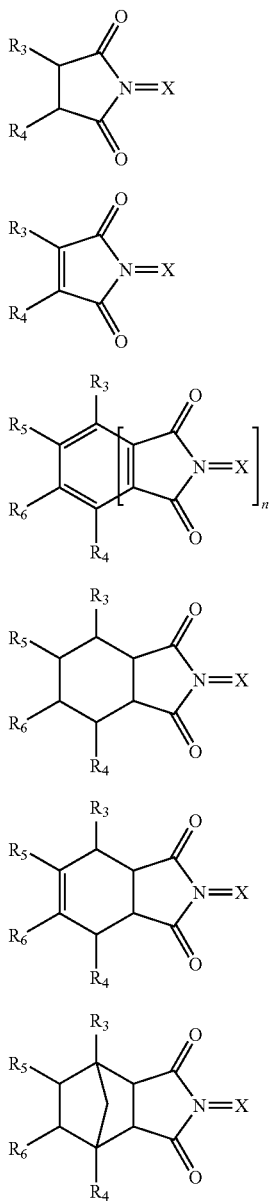

where R3 to R6 respectively denote elements of a set of hydrogen atoms, halogen atoms, alkyl groups, hydroxyl groups, alkoxyl groups, carboxyl groups, alkoxycarbonyl groups, acyl groups, nitro groups, cyano groups, or amino groups, mutually identical or different.

In the compound represented by the general formulas (IVa) to (IVf), substituents R3 to R6 may preferably include: as alkyl groups, those of like alkyl groups to the before-mentioned alkyl groups, which have carbon numbers within a range of 1 to 6 or near, and as alkoxycarbonyl groups, those of like alkoxycarbonyl groups to the before-mentioned alkoxycarbonyl groups, whose alkoxy parts have lower carbon numbers within a range of 1 to 4 or near.

Substituents R3 to R6 may preferably include, as acyl groups, those of like acyl groups to the before-mentioned acyl groups, which have carbon numbers within a range of 1 to 6 or near. As halogen atoms, there may be cited fluorine, chlorine, and bromine atoms. Typically, substituents R3 to R6 may be elements of a set of hydrogen atoms, lower alkyl groups having carbon numbers within a range of 1 to 4 or near, carboxyl groups, nitro groups, and halogen atoms.

In view of the availability, synthesis to be facile, and cost of compound, the imide compound (in particular, that represented by one of the general formulas (IVa) to (IVf)) may preferably comprise an imide compound selective from a set of N-hydroxy succinic acid imide, N-hydroxy maleic acid imide, N-hydroxy hexahydrophthalic acid imide, N,N'-dihydroxycyclohexane tetracarboxylic acid imide, N-hydroxyphthalimide, N-hydroxy tetrabromophthalic acid imide, N-hydroxy tetrachlorophthalic acid imide, N-hydroxy fatty acid imide, N-hydroxy himic acid imide, N-hydroxy trimellitic acid imide, N,N'-dihydroxy pyromellitic acid imide, and N,N'-dihydroxynaphthalene tetracarboxylic acid imide. This compound may be disposed as a coexisting catalyst in the electrolyte membrane.

Such an imide compound may be prepared by a standard imidizing reaction in which a correspondent acid anhydride reacts with hydroxylamine $NH_2OH$, whereby its acid anhydride radical has an opened ring, which is closed for imidization.

The compound represented by the general formula (II) may preferably comprise a compound represented by a general formula (V) below

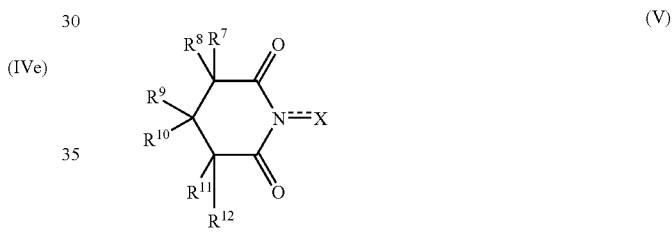

where R7 to R12 respectively denote elements of a set of hydrogen atoms, alkyl groups, aryl groups, cycloalkyl groups, hydroxyl groups, alkoxyl groups, carboxyl groups, substituent carbonyl groups, acyl groups, or acyloxy groups, mutually identical or different. This compound has an N-substitution cyclic imide frame in the form of a six membered-ring.

To this point, an N-substitution cyclic imide frame has a 5-membered ring. Both 5-membered ring and 6-membered ring are hydrolyzable as shown by formulas (B13) and (B14) below.

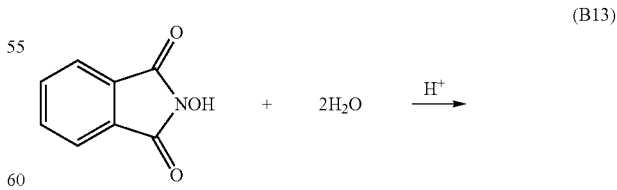

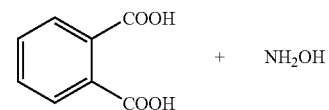

(B14)

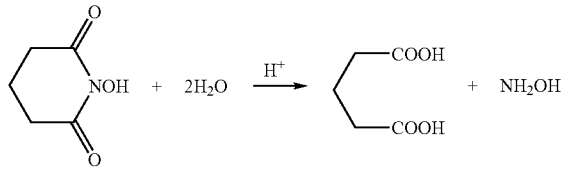

The 6-membered ring is slower in hydrolysis, and higher in hydrolysis resistance, than the 5-membered ring. For compounds having an N-substitution cyclic imide frame, the service as a redox catalyst is repeatable many times, and if the imide frame is a 6-membered ring, the consumption of catalyst can be the more reduced.

The alkyl groups may preferably include a linear chain or branch chain alkyl group of a carbon number within a range of 1 to 10 or near, such as a methyl, an ethyl, a propyl, an isopropyl, a butyl, an isobutyl, a sec-butyl, a t-butyl, a pentyl, a hexyl, a heptyl, an octyl, and a decyl group. The alkyl groups may preferably have carbon numbers within a range of 1 to 6 or near, or more preferably, be lower with a carbon number within a range of 1 to 4 or near.

The aryl groups may preferably include a phenyl group, a naphthyl group, etc. The cycloalkyl groups may preferably include a cyclopentyl, a cyclohexyl, and a cyclooctyl group, and the like.

The alkoxy groups may preferably have carbon numbers within a range of 1 to 10 or near, or more preferably, within a range of 1 to 6 or near, or be lower with a carbon number within a range of 1 to 4 or near. For example, they may be a methoxy, an ethoxy, a propoxy, an isopropoxy, a butoxy, an isobutoxy, a t-butoxy, a pentyloxy, and a hexyloxy group, and the like.

The alkoxycarbonyl groups may preferably include those alkoxycarbonyl groups whose alkoxy parts have carbon numbers within a range of 1 to 10 or near. For example, they may be a methoxycarbonyl, an ethoxycarbonyl, a propoxy carbonyl, an isopropoxy carbonyl, a butoxycarbonyl, an isobutoxycarbonyl, a t-butoxycarbonyl, a pentyloxy carbonyl, and a hexyloxy carbonyl group. The carbon number of alkoxy part may preferably range within 1 to 6 or near, or be as lower as within a range of 1 to 4 or near.

The acyl groups may preferably include those acyl groups having carbon numbers within a range of 1 to 6 or near, for example, a formyl, an acetyl, a propionyl, a butyryl, an isobutyryl, a valeryl, an isovaleryl, and a pivaloyl group.

In the compound represented by the general formula (V), at least two of R7 to R12 may preferably be combined with each other to form a double bond, or an aromatic or nonaromatic ring. Among them, the aromatic ring or the nonaromatic ring may preferably be any one of 5-membered to 12-membered rings, or more preferably, any one of 6-membered to 10-membered rings, and they may be heterocycles or fused heterocycles.

As such rings, there may be taken, for example: nonaromatic hydrocarbon rings, such as cycloalkane rings, e.g, cyclohexane ring, and cycloalkene rings, e.g. cyclohexene ring; nonaromatic bridging rings, such as bridging type hydrocarbon rings, e.g. five-norbornene ring; and aromatic rings, such as benzene rings and naphthalene rings. Those rings may have substituent groups.

In view of the stability and durability of compound, the antioxidant (in particular, the compound represented by the general formula (V)) may preferably comprise a compound represented by one of general formulas (VIa) and (VIb) below

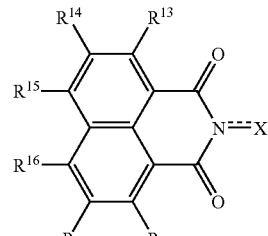

(VIa)

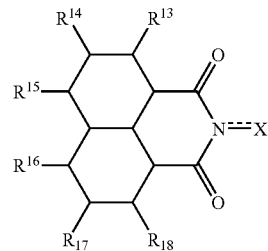

(VIb)

where R13 to R18 respectively denote elements of a set of hydrogen atoms, alkyl groups, hydroxyl groups, alkoxyl groups, carboxyl groups, alkoxycarbonyl groups, acyl groups, nitro groups, cyano groups, or amino groups, mutually identical or different.

The compound represented by one of the general formulas (V), (VIa) and (VIb) may preferably comprise an imide compound selective from a set of N-hydroxyglutaric acid imide, N-hydroxy-1,8-naphthalene dicarboxylic acid imide, N-hydroxy-1,8-decalin dicarboxylic acid imide, N,N'-dihydroxy-1,8; 4,5-naphthalene tetracarboxylic acid imide, N,N'-dihydroxy-1,8; 4,5-decalin tetracarboxylic acid imide, and N,N', N''-trihydroxy isocyanuric acid imide.

Whether a 5-membered ring or a 6-membered ring, such an imide compound may be prepared by a standard imidizing reaction in which a correspondent acid anhydride reacts with hydroxylamine $NH_2OH$, whereby its acid anhydride radical has an opened ring, which is closed for imidization.

The antioxidant (as the compound represented by the general formula (I)) may preferably comprise a compound represented by a general formula (VII) below

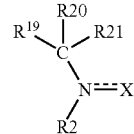

(VII)

where R19 to R21 each respectively denote an alkyl group, or an alkyl group substituted in part by an arbitrary radical, wherein: at least one of R19 to R21 may preferably be chained, ringed, or branched; at least two of R19 to R21 may preferably be mutually combined to form a ring; and at least one of R19 to R21 may preferably have oxygen and nitrogen atoms.

The compound represented by the general formula (VU) may be continuously supplied, for decomposition of continuously generated active oxygen to suppress an oxidation of electrolyte membrane.

In the compound represented by the general formula (VII), substituents R20 and R21 may preferably include a linear chain or branch chain alkyl group of a carbon number within a range of 1 to 10 or near, such as a methyl, an ethyl, a propyl, an isopropyl, a butyl, an isobutyl, a sec-butyl, a t-butyl, a pentyl, a hexyl, a heptyl, an octyl, and a decyl group. They may preferably have carbon numbers within a range of 1 to 6 or near, or more preferably, be lower with a carbon number within a range of 1 to 4 or near.

The antioxidant (in particular, the compound represented by the general formula (VII)) may preferably comprise a compound represented by a general formula (VIII) below

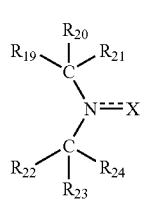

(VIII)

where R19 to R24 each respectively denote an alkyl group, or an alkyl group substituted in part by an arbitrary radical, wherein: at least one of R19 to R24 may preferably be chained, ringed, or branched; R20 and R21, or R23 and R24 may preferably be mutually combined to form a ring; and at least one of R19 to R24 may preferably include oxygen and nitrogen atoms.

In the compound represented by the general formula (VIII), substituents R19 to R24 may preferably include a linear chain or branch chain alkyl group of a carbon number within a range of 1 to 10 or near, such as a methyl, an ethyl, a propyl, an isopropyl, a butyl, an isobutyl, a sec-butyl, a t-butyl, a pentyl, a hexyl, a heptyl, an octyl, and a decyl group. They may preferably have carbon numbers within a range of 1 to 6 or near, or more preferably, be lower with a carbon number within a range of 1 to 4 or near.

The antioxidant (in particular, the compound represented by the general formula (VIII)) may preferably comprise a compound represented by a general formula (IX) below

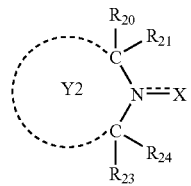

(IX)

where a ring Y2 denotes a 5-membered or 6-membered ring formed by R19 and R22 mutually combined.

As such rings, there may be taken, for example: nonaromatic hydrocarbon rings, such as cycloalkane rings, e.g, cyclohexane ring, and cycloalkene rings, e.g. cyclohexene ring; nonaromatic bridging rings, such as bridging type hydrocarbon rings, e.g. five-norbornene ring; and aromatic rings, such as benzene rings and naphthalene rings. Those rings may have substituent groups.

The antioxidant (in particular, the compound represented by the general formula (IX)) may preferably comprise a compound represented by a general formula (X) below

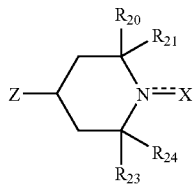

(X)

where Z denotes an element of a set of alkyl groups, aryl groups, alkoxy groups, carboxyl groups, alkoxycarbonyl groups, cyano groups, hydroxyl groups, nitro groups, amino groups, and substituent groups including a hydrogen atom, wherein: Z may preferably be an alkyl group substituted in part by an arbitrary radical; wherein Z may preferably be an alkyl group chained, ringed, or branched in part; Z may preferably be an alkyl group including oxygen and nitrogen atoms; Z may preferably be an aryl group substituted in part by an arbitrary radical; and Z may preferably be an aryl group including oxygen and nitrogen atoms.

The compound represented by the general formula (X) is hardly hydrolyzable, and may be continuously supplied, for decomposition of continuously generated active oxygen to suppress an oxidation of electrolyte membrane.

For substituent Z in the compound represented by the general formula (X), the set of candidate groups may preferably include: as alkyl groups, those of like alkyl groups to the before-mentioned alkyl groups, which have carbon numbers within a range of 1 to 6 or near, as aryl groups, phenyl groups and naphthyl groups; as alkoxy groups, those of like alkoxy groups to the before-mentioned alkoxy groups, which have carbon numbers within a range of 1 to 6 or near, and as carboxyl groups, those carboxyl groups which have carbon numbers within a range of 1 to 4 or near, for example.

The set of candidate groups for substituent Z in general formula (X) may preferably include, as alkoxycarbonyl groups, those alkoxycarbonyl groups whose alkoxy parts have carbon numbers within a range of 1 to 10 or near, such as a methoxycarbonyl, an ethoxycarbonyl, a propoxy carbonyl, an isopropoxy carbonyl, a butoxycarbonyl, an isobutoxycarbonyl, a t-butoxycarbonyl, a pentyloxy carbonyl, and a hexyloxy carbonyl group. The carbon number of alkoxy part may preferably range within 1 to 6 or near, or be as lower as within a range of 1 to 4 or near.

Figure 6:
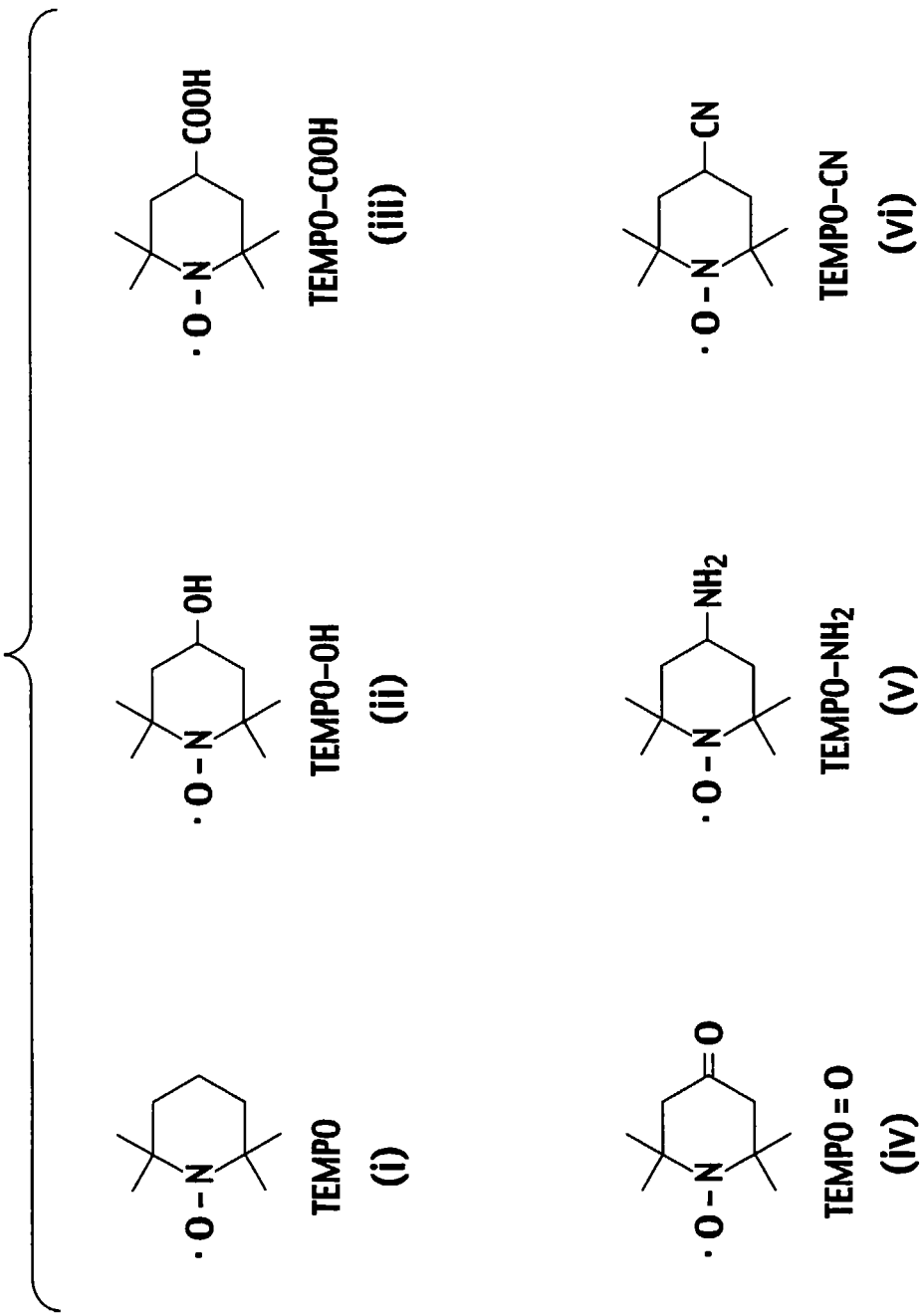
FIG. 6 is a list of chemical formulas of exemplary antioxidants applicable to a fuel for the fuel cell stack of fuel cell system of FIG. 1.

As desirable antioxidants, several examples of compounds representable by the general formula (X) are shown by chemical formulas (i) to (xi) in FIG. 6, where chemical formula (i) represents TEMPO (2,2,6,6-tetramethylpiperidine-1-oxyl), which is an N-hydroxy imide derivative that can reduce oxygen finally to water.

The compound represented by the general formula (IX) may preferably comprise a compound represented by a general formula (XI) below

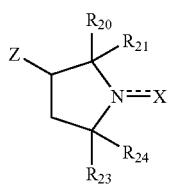

(XI)

where Z denotes an element of a set of alkyl groups, aryl groups, alkoxy groups, carboxyl groups, alkoxycarbonyl groups, cyano groups, hydroxyl groups, nitro groups, amino groups, and substituent groups including a hydrogen atom, wherein: Z may preferably be an alkyl group substituted in part by an arbitrary radical; Z may preferably be an alkyl group chained, ringed, or branched in part; Z may preferably be an alkyl group including oxygen and nitrogen atoms; Z may preferably be an aryl group substituted in part by an arbitrary radical; and Z may preferably be an aryl group including oxygen and nitrogen atoms.

The compound represented by the general formula (IX) may preferably comprise a compound represented by a general formula (XII) below

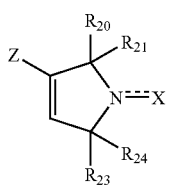

(XII)

where Z denotes an element of a set of alkyl groups, aryl groups, alkoxy groups, carboxyl groups, alkoxycarbonyl groups, cyano groups, hydroxyl groups, nitro groups, amino groups, and substituent groups including a hydrogen atom, wherein: Z may preferably be an alkyl group substituted in part by an arbitrary radical; Z may preferably be an alkyl group chained, ringed, or branched in part; Z may preferably be an alkyl group including oxygen and nitrogen atoms; Z may preferably be an aryl group substituted in part by an arbitrary radical; and Z may preferably be an aryl group including oxygen and nitrogen atoms.

The compound represented by the general formula (XI) or (XII) is hardly hydrolysable like that represented by the general formula (X), and may be continuously supplied, for decomposition of continuously generated active oxygen to suppress an oxidation of electrolyte membrane. The antioxidant represented by the general formula (XI) or (XII) may preferably have like substituents to that represented by the general formula (X).

Figure 7:
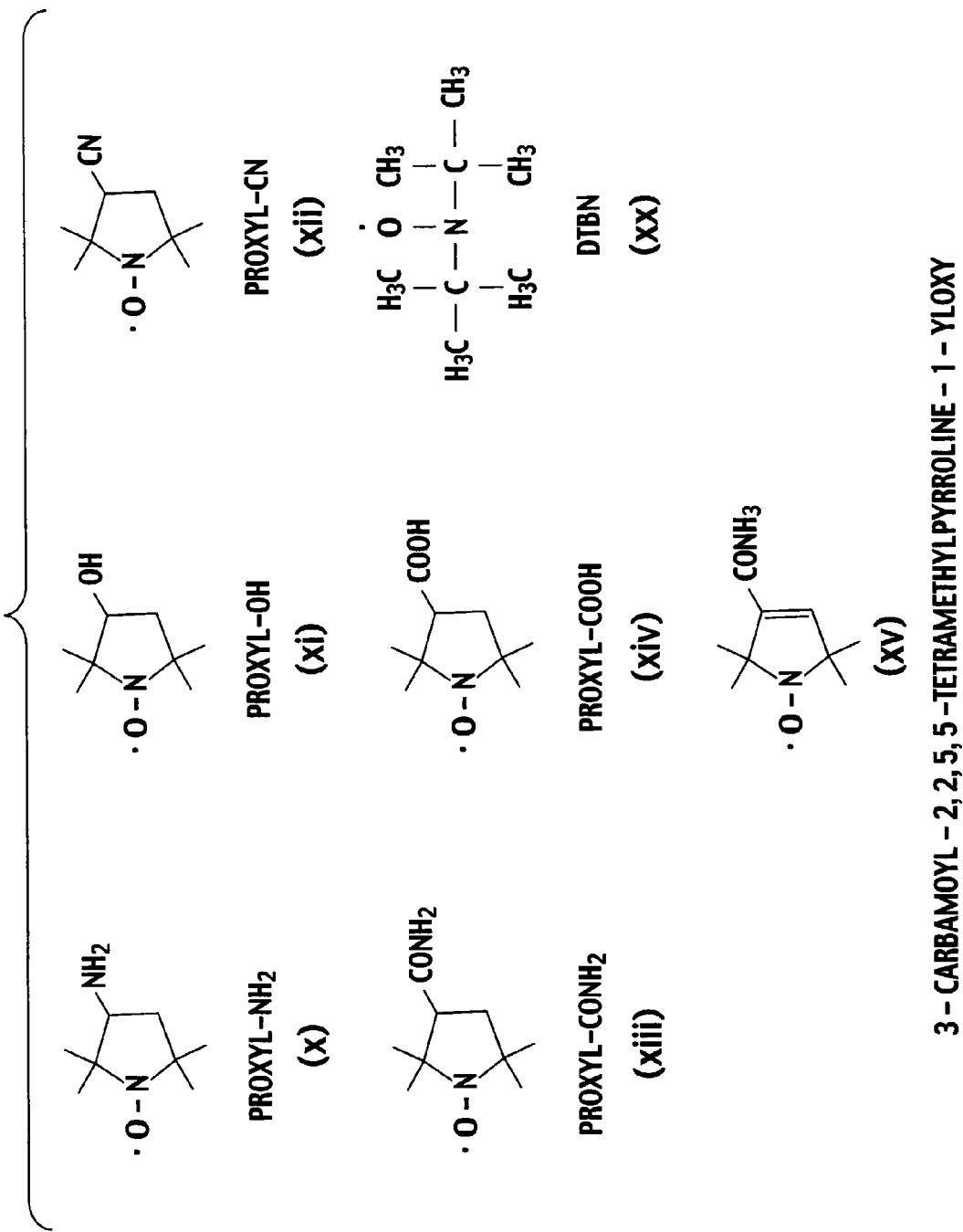
FIG. 7 is a list of chemical formulas of other exemplary antioxidants applicable to a fuel for the fuel cell stack of fuel cell system of FIG. 1.
Figure 8:
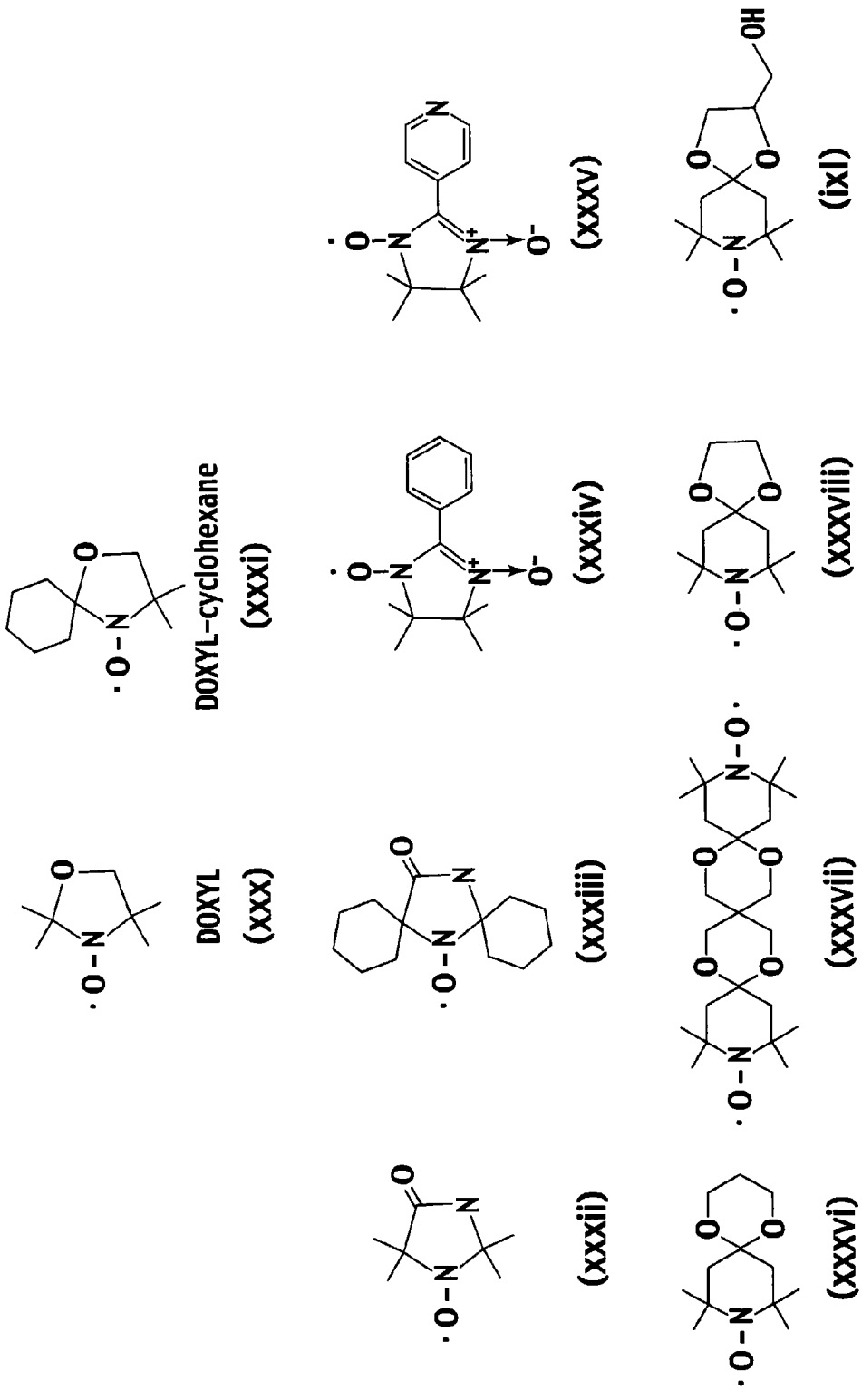
FIG. 8 is a list of chemical formulas of other exemplary antioxidants applicable to a fuel for the fuel cell stack of fuel cell system of FIG. 1.

As desirable antioxidants, several examples of compounds representable by the general formula (XI) or (XII) are shown by chemical formulas (x) to (xv) and (xx) in FIG. 7, chemical formulas (xxx) to (xxxviii) and (ixl) in FIG. 8, and chemical formulas (xl) to (xlvi) in FIG. 9.

As preferred antioxidants representable by the general formula (XI) or (XII), PROXYL (2,2,5,5-tetramethylpyrrolidine-1-oxyl) and DOXYL (4,4-dimethyloxazolidine-3-oxyl) are now cited, which also have a reversible redox cycle in which oxygen can be reduced to water.

Figure 10:
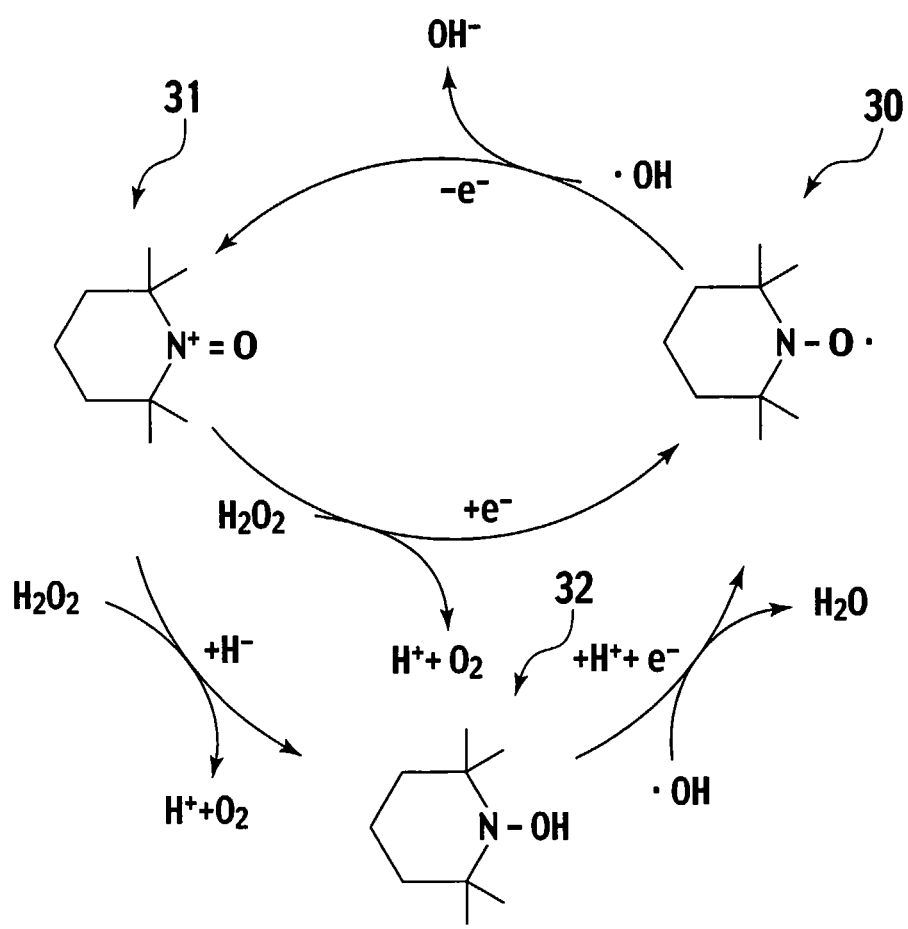
FIG. 10 is a cyclic flow diagram showing the mechanism of disappearance of active oxygen by TEMPO.

FIG. 10 shows a redox cycle of an antioxidant applicable to the fuel for the fuel cell system in the present embodiment, illustrating a mechanism in which hydroxyl radical and hydrogen peroxide are decomposed along processes of oxidation and reduction that occur between a reductant TEMPO 30 and an oxidant TEMPO 31 or 32.

Hydrogen peroxide acts: as a reducing agent, as in the before-mentioned formula (B9), on those substances which have a higher redox potential than hydrogen peroxide; and as an oxidant, as in formula (B15) below, on those substances which have a lower redox potential than hydrogen peroxide.

$$H_2O_2 \rightarrow O_2 + 2H^+ + 2e^-, E°=0.68\ V \qquad (B15)$$

TEMPO is an N-hydroxy imide derivative that has a reversible redox cycle, and performs an oxidation and a reduction respectively including elementary reaction processes shown by formulas (B16) and (B17) below.

$$TEMPO^+ + e^- \rightarrow TEMPO,\ E°=0.81\ V \qquad (B16)$$

$$TEMPO \rightarrow TEMPO^+ + e^-,\ E°=0.81\ V \qquad (B17)$$

TEMPO has a redox potential of 0.81V, which higher than the redox potential (0.86V) of hydrogen peroxide, and lower than that (2.85 V) of hydroxy radical.

Therefore, an N-oxyl radical 30 of TEMPO, that is, a reductant TEMPO 30 acts as a reducing agent on a hydroxy radical (.OH) generated in the electrolyte membrane, i.e., supplies an electron ($e^-$) to the hydroxy radical, changing to an oxidant TEMPO$^+$ 31, whereby the hydroxy radical is reduced to a hydroxyl (OH$^-$), as shown by formula (B18) below.

$$TEMPO + .OH \rightarrow TEMPO^+ + OH^- \qquad (B18)$$

The oxidant TEMPO$^+$ 31 acts as an oxidizing agent on hydrogen peroxide, i.e., performs an oxidation reaction in a direction in which hydrogen peroxide releases hydrogen and changes to oxygen, to thereby recover the state of a reductant TEMPO 30.

The recovery from oxidant TEMPO$^+$ 31 to reductant TEMPO 30 is considered to develop by two routes: one including a reaction process directly proceeding to the reductant TEMPO 30, as shown by formula (B19) below, and the other including reaction processes indirectly proceeding to the reductant TEMPO 30, once passing an intermediate (TEMPO-H) 32, as shown by formulas (B20) and (B21) below.

$$2TEMPO^+ + H_2O_2 \rightarrow 2TEMPO + 2H^+ + O_2 \qquad (B19)$$

$$TEMPO^+ + H_2O_2 \rightarrow TEMPO\text{-}H + H^+ + O_2 \qquad (B20)$$

$$TEMPO\text{-}H + .OH \rightarrow TEMPO + H_2O \qquad (B21)$$

The TEMPO 30, as it has recovered, again acts to reduce hydroxy radical. Thus, there is a redox cycle repeated between reductant TEMPO 30 and oxidant TEMPO$^+$ 31, whereby hydroxy radical as well as hydrogen peroxide is decomposed, so that oxidation of electrolyte is commensurately suppressed, allowing for a prevented deterioration of electrolyte membrane with a maintained durability.

In a situation that a quantity of reductant TEMPO 30 is supplied from the fuel electrode of fuel cell, part of the supplied quantity may be oxidized on catalyst of the fuel electrode, by electrolytic oxidation shown by the formula (B17), and diffused as oxidant TEMPO$^+$ 31 in the electrolyte. However, this oxidant TEMPO$^+$ 31 changes by having hydrogen peroxide acting thereon as a reducing agent, directly or indirectly via intermediate TEMPO-H 32, to recover the state of reductant TEMPO 30, which functions again as an antioxidant that can reduce hydroxy radical.

Such being the case, in the case of TEMPO employed as an antioxidant, as well, the redox cycle turning among TEMPO 30, TEMPO$^+$ 31, and TEMPO$^-$ 32 enables the antioxidant to be reused many times, achieving a continuous decomposition of active oxygen over a long term, allowing for provision of a fuel cell system with a maintained durability. Further, as the redox cycle turns, the antioxidant is kept from acting as an initiator of additional side reactions after it has reduced hydroxy radicals. According to this embodiment, the fuel cell system is thus adapted to serve for an efficient decomposition of reactive oxygen to be eliminated.

In the fuel cell system according to this embodiment, methanol is used as the hydrocarbon fuel, which however is not limited thereto, and may well be any type of fuel available for implementation of oxidation at the fuel electrode with emission of hydrogen ion, for example: liquid hydrocarbon fuels, such as ethanol, isopropyl alcohol, ethylene glycol, formic acid, dimethyl ether, and cyclohexane; and an ascorbic acid aqueous solution in which solid hydrocarbon is dissolved.

A fuel cell system according to the embodiment may be mounted on a fuel cell vehicle, as an application thereof. The fuel cell vehicle is allowed to endure a continuous run over a long time, by mounting thereon a fuel cell system according to the embodiment.

A fuel cell system according to the invention has applications thereof not limited to a fuel cell vehicle, and is applicable, for example, to a fuel cell cogeneration power generating system, a fuel cell home electric appliance, a fuel cell portable device, a fuel cell transport machine, and the like. In such applications, as well, the fuel cell system is adapted for a continuous long service.

EXAMPLES

Description will be made of fuels and fuel cell systems according to examples 1 to 12 and comparative examples 1 and 2 of embodiment of the invention, while the scope of the invention is not limited thereto. Those examples exemplify fuels and fuel cell systems using different antioxidants, examining their effectiveness.

<Sample Preparation>

Example 1

A film of Nafion® 117 (175 μm thick) of Du Pont Co. was cut into 1 cm squares to be used as solid polymer electrolyte membranes. Nafion® membranes were pretreated to the NEDO PEFC R&D project standard treatment, where they were boiled: in 3% hydrogen peroxide aqueous solution for 1 hour, and in distilled water for 1 hour, then, in 1M sulfuric acid solution for 1 hour; and finally, in distilled water for 1 hour, in this order.

Next, for a facilitated ageing resistance judgment in endurance test, pretreated Nafion® membranes were subjected to an ion exchange treatment, where they were soaked in 100 mM $FeSO_4$ aqueous solution for one night or more, and ultrasonically cleaned in distilled water for 15 minutes, for removing ions adhering to membrane to thereby exchange counter ions of Nafion® from $H^+$ to $Fe^{2+}$. Wako pure medicine high grade $FeSO_4.7H_2O$ was used as a reagent.

Next, for each ion-exchanged electrolyte membrane, platinum-ruthenium-supporting carbon (Pt—Ru support carbon catalyst, model: HiSPEC7000, Johnson Matthey Co.) was coated on the fuel electrode side, and platinum-supporting carbon (20 wt % Pt/Vulcan XC-72, Cabot Co.), on the air electrode side, to fabricate a membrane electrode assembly (MEA). Coated quantities of catalyst were 1.0 $g/cm^2$ of platinum. Fabricated MEA was assembled in a single cell, to provide a unit cell for PEFC to be 5 $cm^2$.

50 ppm of NHPI (N-hydroxyphthalic acid imide) was dissolved as antioxidant to an aqueous solution of 10 percent by weight of methanol, to have a resultant NHPI solution used as the fuel.

Cell temperature was kept 70° C.

Example 2

NHPI of example 1 was replaced by NHMI (N-hydroxymaleic acid imide) as antioxidant in the aqueous solution to be used as the fuel; treatment was like to example 1.

Example 3

NHPI of example 1 was replaced by NHSI (N-hydroxysuccinic acid imide) as antioxidant in the aqueous solution to be used as the fuel; treatment was like to example 1.

Example 4

NHPI of example 1 was replaced by NHGI (N-hydroxyglutaric acid imide) as antioxidant in the aqueous solution to be used as the fuel; treatment was like to example 1.

Example 5

NHPI of example 1 was replaced by THICA (N,N',N''-trihydroxyisocyanuric acid imide) as antioxidant in the aqueous solution to be used as the fuel; treatment was like to example 1.

Comparative Example 1

No antioxidant was dissolved in the aqueous solution of example 1.

Example 6

An S-PES (sulfonated polyethersulfone) film was employed for preparation of solid polymer electrolyte membranes in example 6, as well as in examples 7 to 12. This film is equivalent to that described in "researches and developments of a durability-elevated hydrocarbon system electrolyte membrane for proton-exchange membrane fuel cells in the proton-exchange membrane fuel cell elements technology development and like program in the proton-exchange membrane fuel cell system technology project", p. 31, 2002 yearly results report of the New Energy and Industrial Technology Development Organization of Japan.

A film of S-PES (170 μm thick) was cut into 1 cm squares to be used as solid polymer electrolyte membranes, each of which was coated, at the fuel electrode side, with platinum-ruthenium-supporting carbon (Pt—Ru support carbon catalyst, model: HiSPEC7000, Johnson Matthey Co.), and at the air electrode side, with platinum-supporting carbon (2 wt % Pt/Vulcan XC-72, Cabot Co.), to fabricate a membrane electrode assembly (MEA) Fabricated MEA was assembled in a single cell, to provide a unit cell for PEFC to be 5 $cm^2$.

50 ppm of TEMPO-OH was dissolved as antioxidant to an aqueous solution of 10 percent by weight of methanol to have a resultant TEMPO-OH solution used as the fuel.

Cell temperature was kept 70° C.

Example 7

TEMPO-OH of example 6 was replaced by TEMPO-COOH (Aldrich Co.) as antioxidant in the aqueous solution to be used as the fuel; treatment was like to example 6.

Example 8

TEMPO-OH of example 6 was replaced by TEMPO (Aldrich Co.) as antioxidant in the aqueous solution to be used as the fuel; treatment was like to example 6.

Example 9

TEMPO-OH of example 6 was replaced by PROXYL-CONH$_2$ (Aldrich Co.) as antioxidant in the aqueous solution to be used as the fuel; treatment was like to example 6.

Example 10

TEMPO-OH of example 6 was replaced by PROXYL-COOH (Aldrich Co.) as antioxidant in the aqueous solution to be used as the fuel; treatment was like to example 6.

Example 11

TEMPO-OH of example 6 was replaced by 3-carbamoyl-2,2,5,5-tetramethylpyrroline-1-yloxy (Aldrich Co.) as antioxidant in the aqueous solution to be used as the fuel; treatment was like to example 6.

Example 12

TEMPO-OH of example 6 was replaced by DTBN (di-t-butylnitroxide, Aldrich Co.) as antioxidant in the aqueous solution to be used as the fuel; treatment was like to example 6.

Comparative Example 2

No antioxidant was dissolved in the aqueous solution of example 6.

Samples of the foregoing examples were evaluated, as follows:

<Measurements of Redox Potential>

Figure 11:
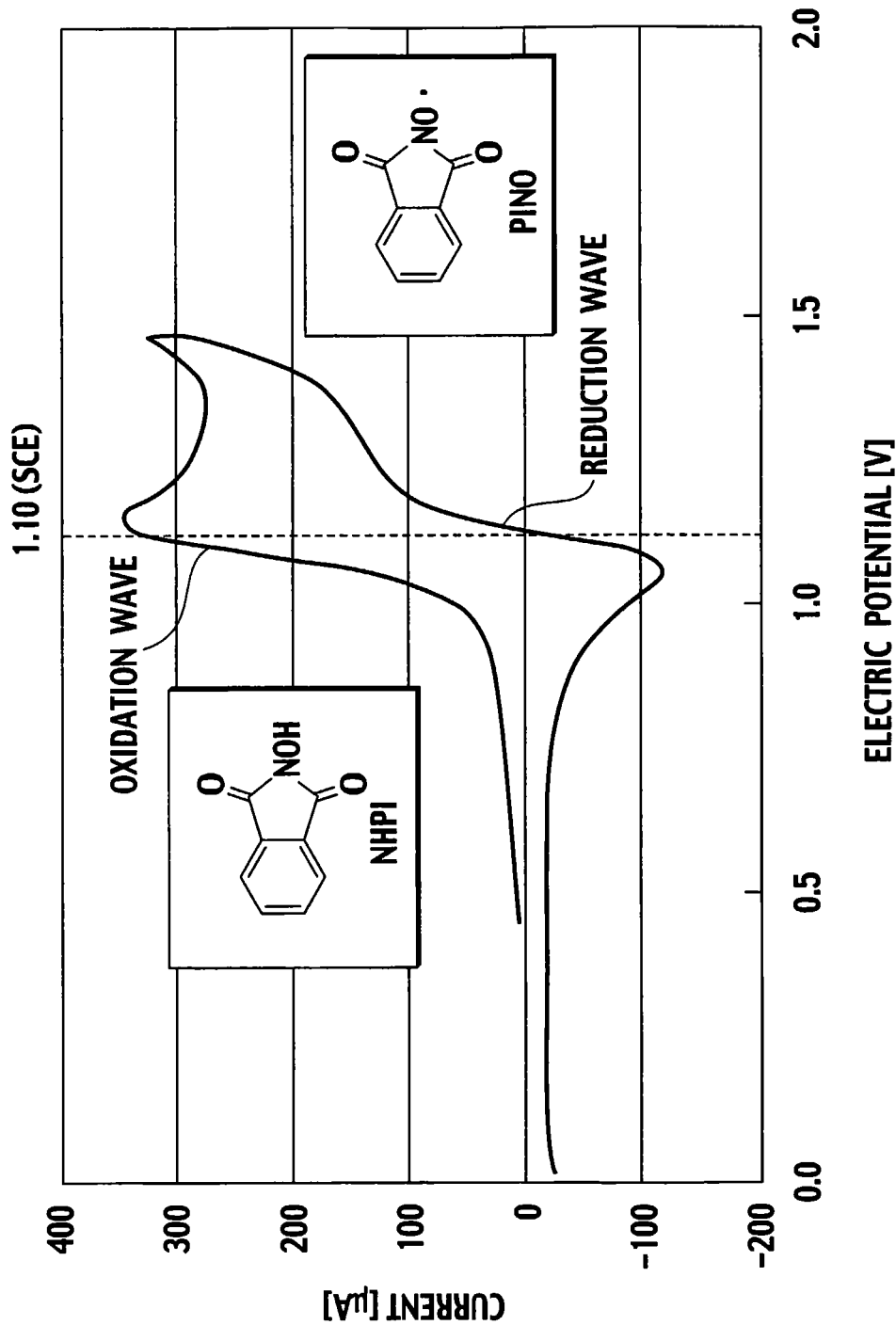
FIG. 11 is a cyclic voltammogram of electrode reactions of NHPI.

Redox potentials of the compounds employed in those examples were measured by using: glassy carbon as an acting electrode; platinum as a counter electrode; a saturated calomel electrode (SCE) as a reference electrode; and 1M sulfuric acid as an electrolytic solution. FIG. 11 shows exemplary measurements of NHPI as a typical imide system compound, and FIG. 12, exemplary measurements of TEMPO as a typical TEMPO system compound. To the SCE, a redox potential E(SCE) was measured, which has a relationship to the standard potential E° (NHE), as shown by expression (C1) below.

$$E°(NHE)=E(SCE)+0.24V \tag{C1}$$

Figure 12:
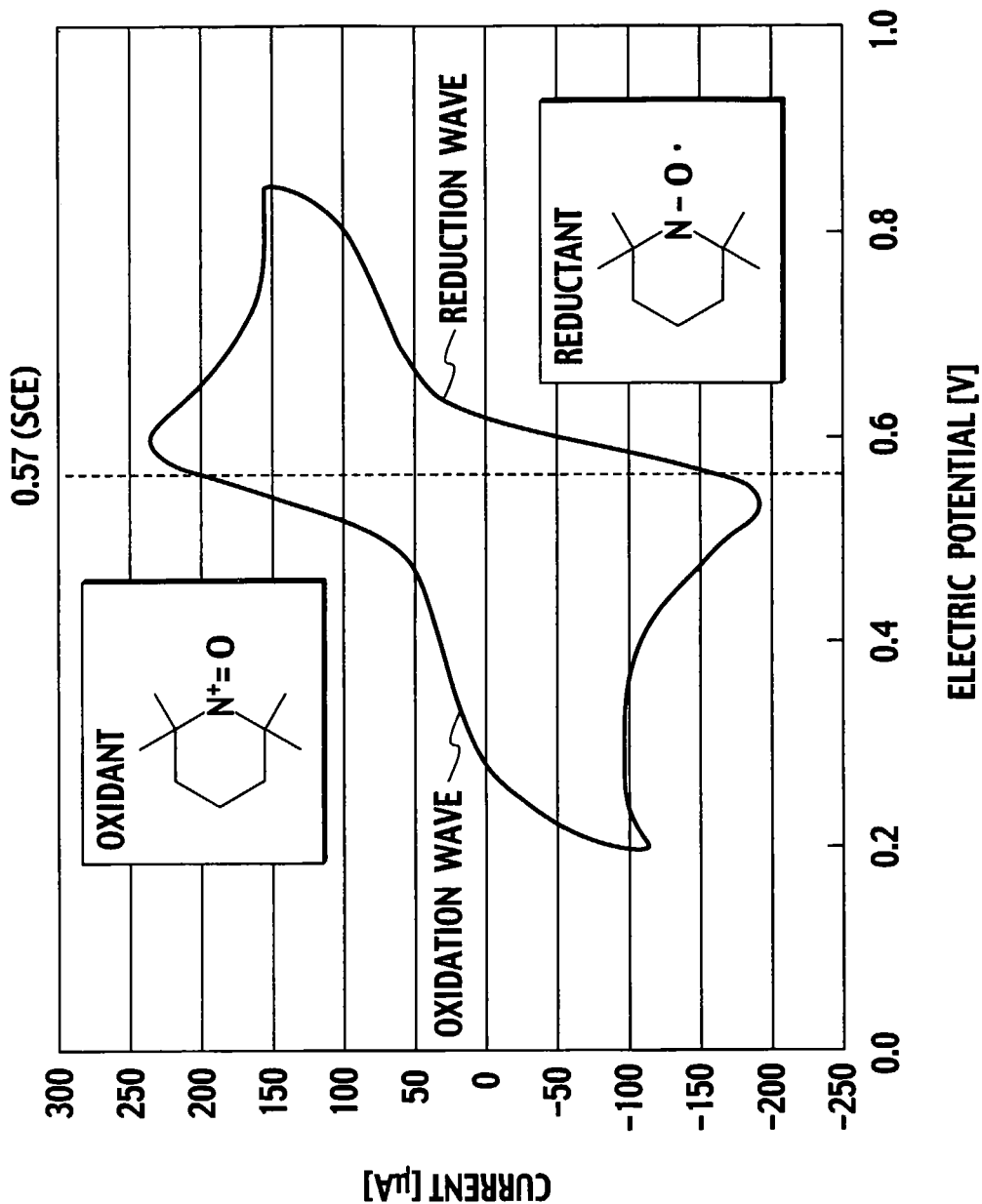
FIG. 12 is a cyclic voltammogram of electrode reactions of TEMPO.

As apparent from FIGS. 11 and 12, NHPI has a redox potential E(SCE) near 1.10V, a and TEMPO, a redox potential E(SCE) near 0.57V, which means NHPI and TEMPO are such compounds that can act as a reducing agent on hydroxy radical and as an oxidizing agent on hydrogen peroxide, thus meeting the objective of embodiment of the invention described.

<Start and Stop Repeating Endurance Test>

For the fuel cell to be tested, an open-circuit condition was held for 30 minutes to start the test. In the test, supplying the fuel prepared in each example by a flow rate of 0.1 ml/min to the unit cell, the current density was increased from an initial state of discharge until the terminal voltage drops to a level of 0.15 V or less, and after this level of terminal voltage was reached, the fuel cell was again changed to the open-circuit condition, which was held for 5 minutes.

This operation was repeated, counting the number of times of repetition, and the durability of unit cell to be compared was defined as the number of repetition times counted upon a voltage drop to a level of 0.1 V or less under a condition of power generation with a current density of 0.3 mA/cm$^3$.

Figure 13:
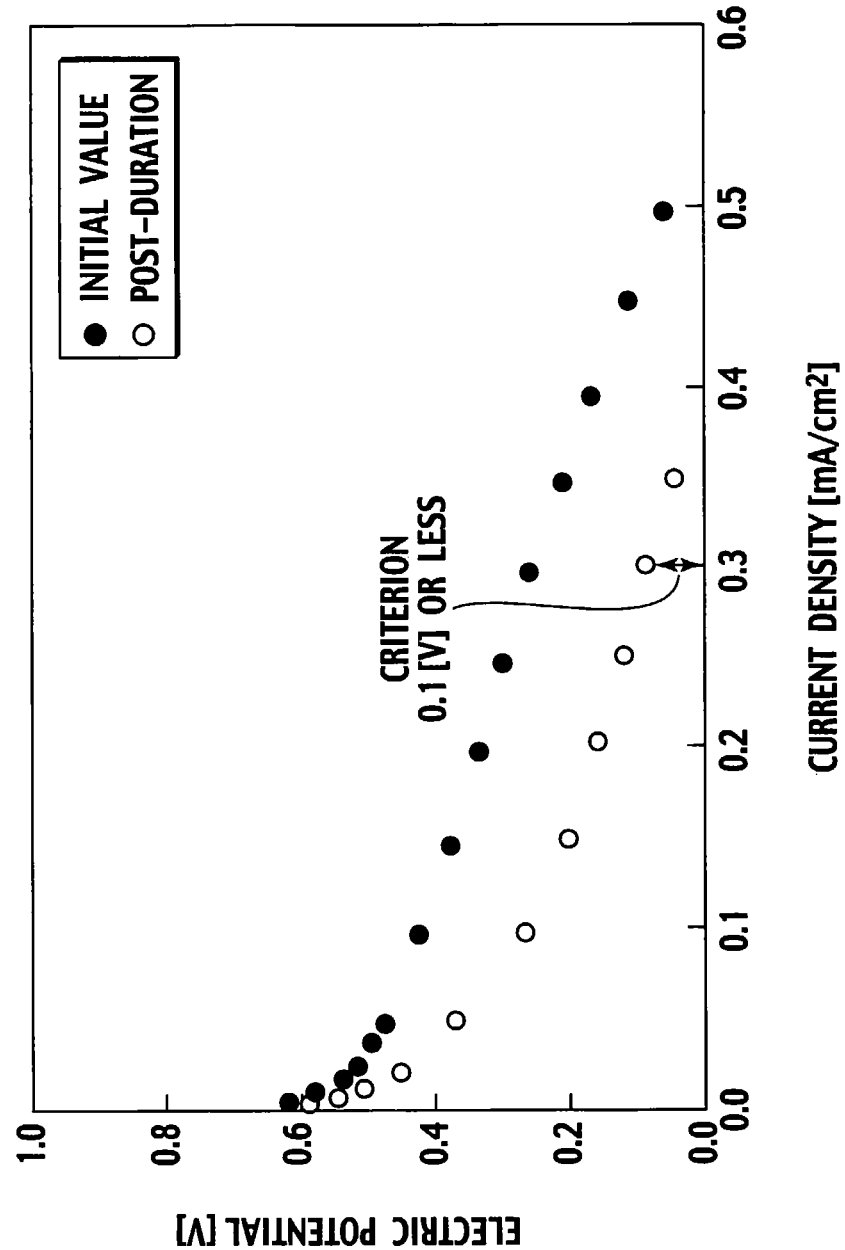
FIG. 13 is a graph showing results of a start and stop repeating endurance test.

FIG. 13 illustrates, in a graph, voltage (as potential) vs. current (in density) characteristic values in an initial phase of, as well as after, the start and stop repeating endurance test of a unit cell according to the example 1. In this graph, under a condition of power generation with a current density of 0.3 mA/cm$^3$, a voltage level of 0.1 V or less is reached at a certain number of times of repetition, which is referred to "start-stop repetition time number".

For analysis of deterioration of Nafion® membrane, measurements were made of concentrations of fluoride ions and sulfate ions emitted upon decomposition of the membrane. For S-PES membrane, concentration measurements were made of sulfate ions emitted upon membrane decomposition. For detection of transferred ions, discharged liquid from the air electrode was collected, and measured by using an ion chromatograph. The ion chromatograph was a Daionecc Co. make (model name: CX-120).

As a specific test method for reeve examples, as well as for comparative examples, comparison was made of samples of liquid discharged from the air electrode upon a completion of 100 times of repetition in the start and stop repeating endurance test.

For examples 1 to 5 and comparative example 1, the type of electrolyte membrane, used antioxidant, redox potential of antioxidant, start-stop repetition time number, and presence or absence of fluoride ion and sulfate ion are listed in Table 1 below.

TABLE 1

| | Electrolyte membrane | Antioxidant | Redox potential | Repetition time no. | Fluoride Ion*) | Sulfate Ion*) |
|---|---|---|---|---|---|---|
| Example 1 | Nafion ® | NHPI | 1.34 | 300 | X | X |
| Example 2 | Nafion ® | NHMI | 1.34 | 250 | X | X |
| Example 3 | Nafion ® | NHSI | 1.36 | 220 | X | X |
| Example 4 | Nafion ® | NHGI | 1.38 | 350 | X | X |
| Example 5 | Nafion ® | THICA | 1.40 | 350 | X | X |
| Com. Ex 1 | Nafion ® | none | — | 80 | ○ | ○ |

*)○: present, X: absent

For examples 6 to 11 and comparative example 2, the above-noted items are listed in Table-2 below.

TABLE 2

| | Electrolyte membrane | Antioxidant | Redox potential | Repetition time no. | Fluoride Ion*) | Sulfate Ion*) |
|---|---|---|---|---|---|---|
| Example 6 | S-PES | TEMPO-OH | 0.81 | 160 | X | X |
| Example 7 | S-PES | TEMPO-COOH | 0.81 | 180 | X | X |
| Example 8 | S-PES | TEMPO | 0.81 | 180 | X | X |
| Example 9 | S-PES | PROXYL-CONH$_2$ | 0.85 | 180 | X | X |
| Example 10 | S-PES | PROXYL-COOH | 0.86 | 170 | X | X |
| Example 11 | S-PES | **) | 0.95 | 130 | X | X |

TABLE 2-continued

| | Electrolyte membrane | Antioxidant | Redox potential | Repetition time no. | Fluoride Ion*) | Sulfate Ion*) |
|---|---|---|---|---|---|---|
| Example 12 | S-PES | DTEN | 0.80 | 140 | X | X |
| Com. Ex 2 | S-PES | none | — | 50 | X | ○ |

*)○: present, X: absent
**) 3-carbamoyl-2,2,5,5-tetramethylpyrroline-1-yloxy

The antioxidants employed in examples 1 to 12 had their redox potentials within a range of a potential of 0.68V (NHE) where hydrogen peroxide acts as an oxidizing agent and a potential of 1.77V (NHE) where hydrogen peroxide acts as a reducing agent, thus meeting the objective of embodiment of the invention described.

For the comparative example 1 using no antioxidant, the start and stop repeating endurance test showed, at a start-stop repetition time number of 80, a voltage drop to a level of 0.1 V or less.

On the contrary, in each of examples 1 to 5 where an antioxidant was dissolved in the fuel, the start-stop repetition time number was within 220 to 350, proving a suppressed deterioration of solid polymer electrolyte membrane by addition of the antioxidant, with an enhanced durability.

In the comparative example 2 using a hydrocarbon system electrolyte membrane, the voltage dropped to a level of 0.1 V or less at a start-stop repetition time number of 50.

On the contrary, in examples 6 to 12, the start-stop repetition time number raised with 130 to 180, proving a suppressed deterioration of solid polymer electrolyte membrane by addition of the antioxidant, with an enhanced durability.

Ion chromatograph analyses revealed a detection of fluoride ion and sulfate ion in the comparative example 1, and a detection of sulfate ion in the comparative example 2, supporting a deterioration by decomposition of electrolyte membrane.

On the contrary, in each of examples 1 to 5, emission of fluoride ion and sulfate ion was below detection limits, proving a suppressed decomposition of Nafion® membrane by introduction of antioxidant.

In each of examples 6 to 12, as well, emission of sulfate ion was below detection limits, proving a suppressed decomposition of S-PES membrane by introduction of antioxidant.

Although perfluorosulfonic acid system polymers typified by the Nafion® film having wide application to an electrolyte membrane of a fuel cell in a fuel cell system, as well as hydrocarbon system polymers referred to S-PES, are put in a situation where they are unsuccessfully considered having a sufficient tolerance by generation of active oxygen at an air electrode of the fuel cell, as will be seen from the foregoing description, by mixing or dissolving an antioxidant to a liquid fuel according to an embodiment of the invention, active oxygen can be decomposed even if the generation is continuous, thus enabling a prevention of deterioration of the electrolyte membrane, allowing for an enhanced durability of fuel cell system.

The contents of Japanese Patent Application No. 2005-362185, filed on Dec. 15, 2005, are incorporated herein by reference.

While preferred embodiments of the present invention have been described using specific terms, such description is for illustrative purposes, and it is to be understood that changes and variations may be made without departing from the spirit or scope of the following claims.

Industrial Applicability

The present invention provides an antioxidative fuel for a direct type fuel cell, and a fuel cell system and an operating method for a fuel cell system having an enhanced durability. The invention implements a fuel cell vehicle endurable with a continuous run over long time.

The invention claimed is:

1. A fuel suitable for a direct type fuel cell including a solid polymer electrolyte membrane. the fuel comprising:
   a hydrocarbon; and
   an antioxidant that reduces hydroxyl radicals contained in the solid polymer electrolyte membrane to water, the antioxidant comprising a compound represented by a general formula (II) below

(II)

where a ring Y1 comprises any ring of a set of 5-membered to 12-membered rings double-bonded and aromatic or nonaromatic, and X denotes an oxygen atom or hydroxyl group.

2. The fuel as claimed in claim 1, wherein an oxidant of the antioxidant is changeable to a chemically stable hydrolysate.

3. The fuel as claimed in claim 1, wherein the antioxidant has a standard oxidation-reduction potential greater than 0.68 V (NHE) and smaller than 2.85 V (NHE).

4. The fuel as claimed in claim 1, wherein the antioxidant has a concentration within a range of $10^{-4}$ to 1% to the fuel.

5. The fuel as claimed in claim 1, wherein the antioxidant has a concentration within a range of $10^{-3}$ to 1% to the fuel.

6. The fuel as claimed in claim 1, wherein the compound represented by the general formula (II) comprises an imide compound represented by a general formula (III) below

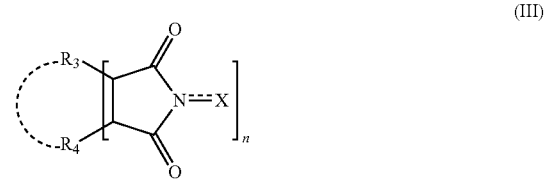

(III)

where R3 and R4 respectively denote elements of a set of hydrogen atoms, halogen atoms, alkyl groups, aryl groups, cycloalkyl groups, hydroxyl groups, alkoxyl groups, carboxyl groups, alkoxycarbonyl groups, or acyl groups, mutually identical or different, and n denotes an integer within 1 to 3.

7. The fuel as claimed in claim 1, wherein the compound represented by the general formula (II) comprises an imide compound represented by a general formula (III) below

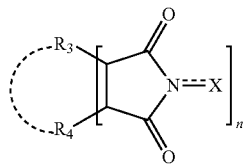
(III)

where R3 and R4 are combined with each other to form an aromatic ring, or a nonaromatic ring.

8. The fuel as claimed in claim 7, wherein R3 and R4 are combined with each other to form any ring of 5-membered to 12-membered rings aromatic or nonaromatic.

9. The fuel as claimed in claim 8, wherein R3 and R4 are combined with each other to form any ring selective from a set of a cycloalkane, a cycloalkene, a bridged hydrocarbon ring, and an aromatic ring, and substitutions thereof.

10. The fuel as claimed in claim 7, wherein the compound represented by the general formula (III) comprises an imide compound represented by one of general formulas (IVa) to (IVf) below

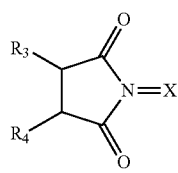
(IVa)

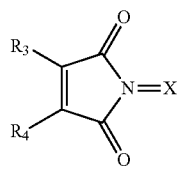
(IVb)

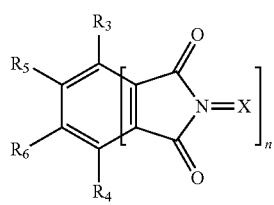
(IVc)

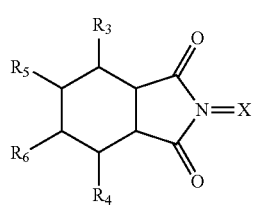
(IVd)

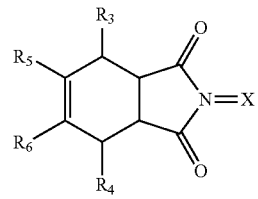
(IVe)

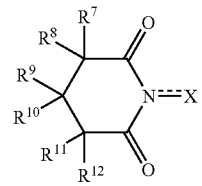
(IVf)

where R3 to R6 respectively denote elements of a set of hydrogen atoms, halogen atoms, alkyl groups, hydroxyl groups, alkoxyl groups, carboxyl groups, alkoxycarbonyl groups, acyl groups, nitro groups, cyano groups, or amino groups, mutually identical or different.

11. The fuel as claimed in claim 10, wherein the imide compound represented by one of the general formulas (IVa) to (IVf) comprises an imide compound selective from a set of N-hydroxy succinic acid imide, N-hydroxy maleic acid imide, N-hydroxy hexahydrophthalic acid imide, N,N'-dihydroxycyclohexane tetracarboxylic acid imide, N-hydroxyphthalimide, N-hydroxy tetrabromophthalic acid imide, N-hydroxy tetrachlorophthalic acid imide, N-hydroxy fatty acid imide, N-hydroxy himic acid imide, N-hydroxy trimellitic acid imide, N,N'-dihydroxy pyromellitic acid imide, and N,N'-dihydroxynaphthalene tetracarboxylic acid imide.

12. The fuel as claimed in claim 1, wherein the compound represented by the general formula (II) comprises a compound represented by a general formula (V) below (V)

where R7 to R12 respectively denote elements of a set of hydrogen atoms, alkyl groups, aryl groups, cycloalkyl groups, hydroxyl groups, alkoxyl groups, carboxyl groups, substituent carbonyl groups, acyl groups, or acyloxy groups, mutually identical or different.

13. The fuel as claimed in claim 1, wherein the compound represented by the general formula (II) comprises a compound represented by a general formula (V) below

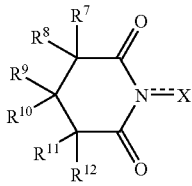
(V)

where at least two of R7 to R12 are combined with each other to form a double bond, or an aromatic or nonaromatic ring.

14. The fuel as claimed in claim 13, wherein the aromatic or nonaromatic ring to be formed by at least two of R7 to R12 combined with each other comprises an N-substituent cyclic imide group.

15. The fuel as claimed in claim 13, wherein the compound represented by the general formula (V) comprises a compound represented by one of general formulas (VIa) and (VIb) below

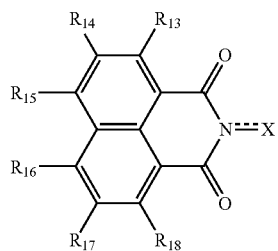
(VIa)

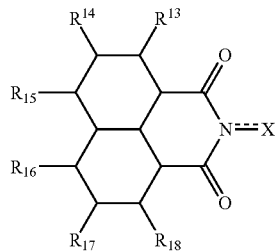
(VIb)

where R13 to R18 respectively denote elements of a set of hydrogen atoms, alkyl groups, hydroxyl groups, alkoxyl groups, carboxyl groups, alkoxycarbonyl groups, acyl groups, nitro groups, cyano groups, or amino groups, mutually identical or different.

16. The fuel as claimed in claim 12, wherein the compound represented by the general formula (V) comprises an imide compound selective from a set of N-hydroxyglutaric acid imide, N-hydroxy-1, 8-naphthalene dicarboxylic acid imide, N-hydroxy-1, 8-decalin dicarboxylic acid imide, N, N'-dihydroxy-1, 8; 4, 5-naphthalene tetracarboxylic acid imide, N, N'-dihydroxy-1, 8; 4, 5-decalin tetracarboxylic acid imide, and N, N', N'' trihydroxy isocyanuric acid imide.

17. The fuel as claimed in claim 15, wherein the compound represented by one of the general formulas (VIa) and (VIb) comprises an imide compound selective from a set of N-hydroxyglutaric acid imide, N-hydroxy-1, 8-naphthalene dicarboxylic acid imide, N-hydroxy-1, 8-decalin dicarboxylic acid imide, N, N'-dihydroxy-1, 8; 4, 5-naphthalene tetracarboxylic acid imide, N, N'-dihydroxy-1, 8; 4, 5-decalin tetracarboxylic acid imide, and N, N', N'' trihydroxy isocyanuric acid imide.

18. The fuel as claimed in claim 1, wherein the compound has a standard oxidation-reduction potential greater than 0.68 V (NHE) and smaller than 1.00 V (NHE).

19. A fuel cell system comprising:
a direct type fuel cell; and
a fuel supply configured to supply the fuel cell with a fuel according to claim 1.

20. The fuel cell system as claimed in claim 19, wherein an antioxidant in the fuel or an oxidant of the antioxidant is changed by oxidation by a catalyst in an air electrode of the fuel cell to $CO_2$, $H_2O$, or $N_2$ to be discharged.

21. A fuel cell vehicle comprising a fuel cell system according to claim 19.

22. An operating method for a fuel cell system including a direct type fuel cell, the operating method comprising supplying the fuel cell with a fuel according to claim 1.

23. The fuel as claimed in claim 1, wherein the antioxidant is an organic mediator which reduces the hydroxyl radicals and changes to an oxidant, and thereafter returns to an original form by reaction with hydrogen peroxide contained in the direct type fuel cell.

24. The fuel as claimed in claim 1, wherein the direct type fuel cell comprises a membrane-electrode assembly including an air electrode, a fuel electrode, and the solid polymer electrolyte membrane therebetween, and the fuel is supplied to the fuel electrode.

25. The fuel cell system as claimed in claim 24, wherein an antioxidant in the fuel or an oxidant of the antioxidant is changed by oxidation by a catalyst in an air electrode of the fuel cell to CO2, H2O, or N2 to be discharged.

26. A fuel cell vehicle comprising a fuel cell system according to claim 24.

* * * * *